United States Patent
Donovan et al.

(10) Patent No.: US 7,417,768 B1
(45) Date of Patent: Aug. 26, 2008

(54) APPARATUS AND METHOD FOR MITIGATING COLORANT-DEPOSITION ERRORS IN INCREMENTAL PRINTING

(75) Inventors: David H. Donovan, San Diego, CA (US); Miquel Boleda, Barcelona (ES); Johan Lammens, Barcelona (ES); Francesc Subirada, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 758 days.

(21) Appl. No.: 09/688,610

(22) Filed: Oct. 13, 2000

(51) Int. Cl.
*G06K 15/00* (2006.01)
*H04N 1/40* (2006.01)

(52) U.S. Cl. .......... 358/2.1; 358/3.06; 358/502
(58) Field of Classification Search ............... 358/1.4, 358/1.8, 3.26, 406, 502, 3.03, 519, 1.9, 404, 358/534; 382/270
See application file for complete search history.

(56) References Cited

U.S. PATENT DOCUMENTS

| | | | | |
|---|---|---|---|---|
| 4,891,714 A * | 1/1990 | Klees | .......... | 358/3.03 |
| 4,924,301 A * | 5/1990 | Surbrook | .......... | 358/534 |
| 5,287,162 A * | 2/1994 | de Jong et al. | .......... | 399/49 |
| 5,289,210 A * | 2/1994 | Takayanagi | .......... | 347/14 |
| 5,384,587 A * | 1/1995 | Takagi et al. | .......... | 347/41 |
| 5,410,414 A * | 4/1995 | Curry | .......... | 358/3.23 |
| 5,436,739 A * | 7/1995 | Imao et al. | .......... | 358/518 |
| 5,600,350 A * | 2/1997 | Cobbs et al. | .......... | 347/19 |
| 5,731,827 A * | 3/1998 | Mantell et al. | .......... | 347/40 |
| 5,796,414 A * | 8/1998 | Sievert et al. | .......... | 347/19 |
| 5,798,773 A * | 8/1998 | Hiramatsu et al. | .......... | 347/19 |
| 5,813,333 A * | 9/1998 | Ohno | .......... | 101/181 |
| 5,847,722 A * | 12/1998 | Hackleman | .......... | 347/19 |
| 5,943,448 A * | 8/1999 | Tatsuta | .......... | 382/270 |
| 5,988,790 A * | 11/1999 | Koike et al. | .......... | 347/41 |

(Continued)

FOREIGN PATENT DOCUMENTS

EP    1029687    6/1999

(Continued)

*Primary Examiner*—Edward L. Coles
*Assistant Examiner*—James A Thompson
(74) *Attorney, Agent, or Firm*—Peter I. Lippman

(57) ABSTRACT

CDE is measured for each nozzle array, to enable modification of a mapping between input image data and intended printing marks to compensate for the CDE. Printing proceeds using the modified mapping, which is either an optical-density transformation of data to printing marks or a spatial-resolution relation between image data and intended pixel grid. The density transformation preferably includes a dither mask (but can be error-diffusion thresholding instead); the resolution relation includes scaling of image data to pixel grid. For some invention forms, CDE includes printing-density defects, measured and used to derive a correction pattern—in turn used to modify halftone thresholding. For other forms CDE includes swath-height error, but still this is measured and used to derive a correction pattern etc. For still other forms, however, CDE includes swath-height error and correction takes the form of scaling. When the halftoning forms are applied to plural-pass printing, a printmask is used to map the dither mask etc. to the nozzle array, enabling application of the correction to the mask. Halftone forms ideally uses a gamma function, though threshold or linear corrections are possible instead. Halftone correction is effective in single-pass printing. The swath-height correction can modify heights of all nozzle arrays. Computations are done at most only once for a full image.

34 Claims, 6 Drawing Sheets

U.S. PATENT DOCUMENTS

| | | | |
|---|---|---|---|
| 6,089,693 A * | 7/2000 | Drake et al. | 347/19 |
| 6,172,700 B1 * | 1/2001 | Obata | 347/237 |
| 6,333,793 B1 * | 12/2001 | Kobayashi | 358/1.9 |
| 6,412,903 B1 * | 7/2002 | Lee et al. | 347/19 |
| 6,672,697 B2 * | 1/2004 | Haflinger | 347/12 |

FOREIGN PATENT DOCUMENTS

| | | |
|---|---|---|
| EP | 0983863 | 9/1999 |
| EP | 1034939 | 2/2000 |
| EP | A-0 983 863 | 3/2000 |
| EP | A-1 029 687 | 8/2000 |
| EP | A-1 034 939 | 9/2000 |
| JP | 04-041244 | 2/1992 |
| JP | 07-137290 | 5/1995 |
| JP | 07-246717 | 9/1995 |

* cited by examiner

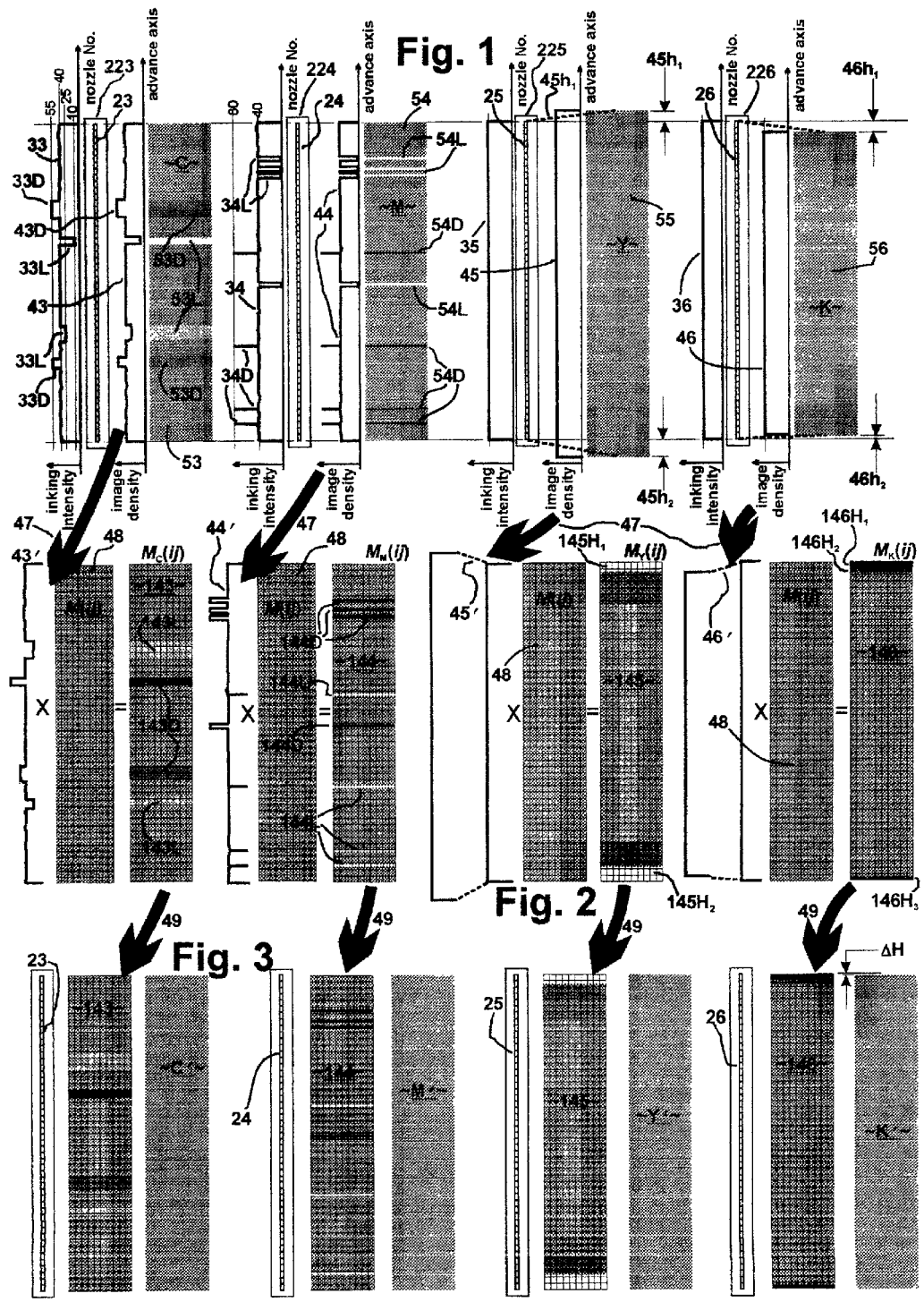

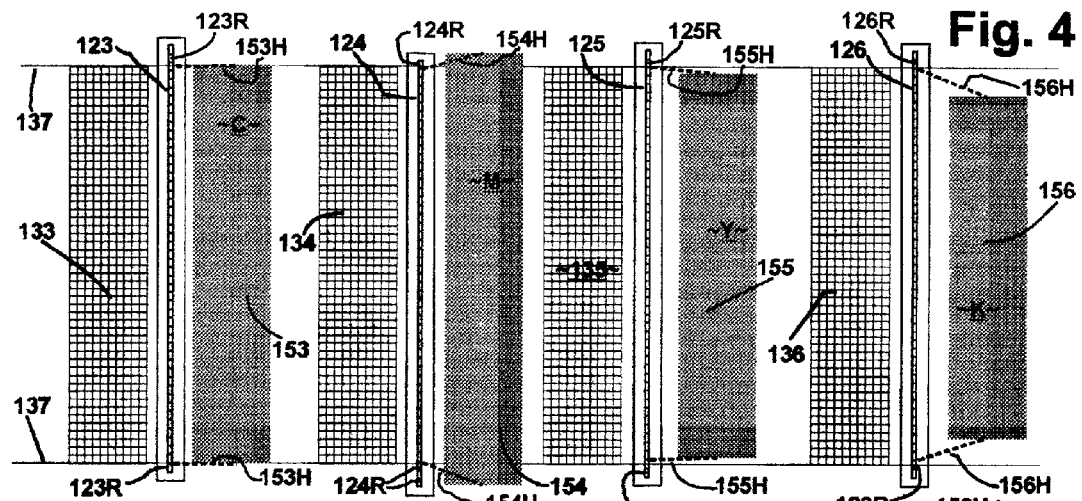
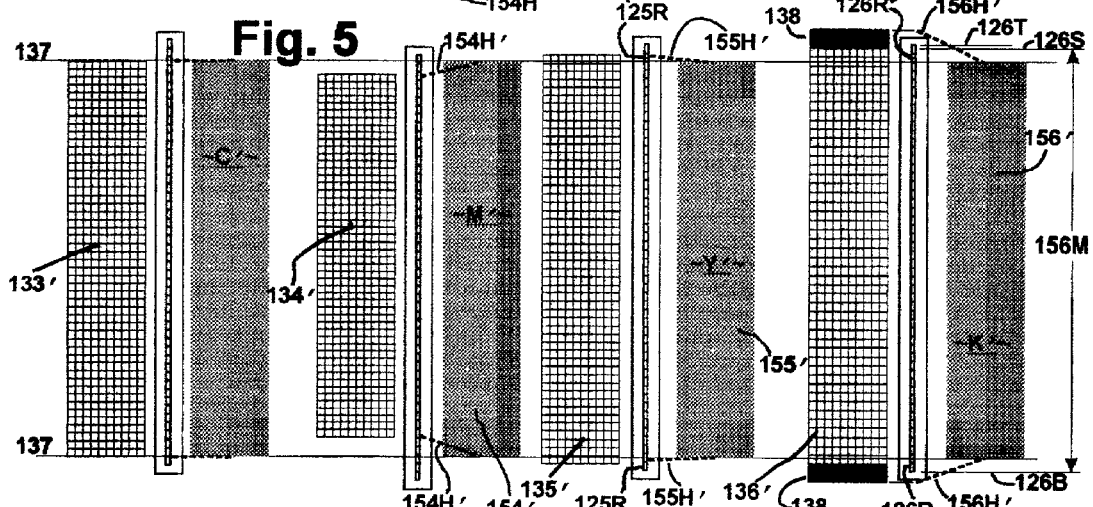
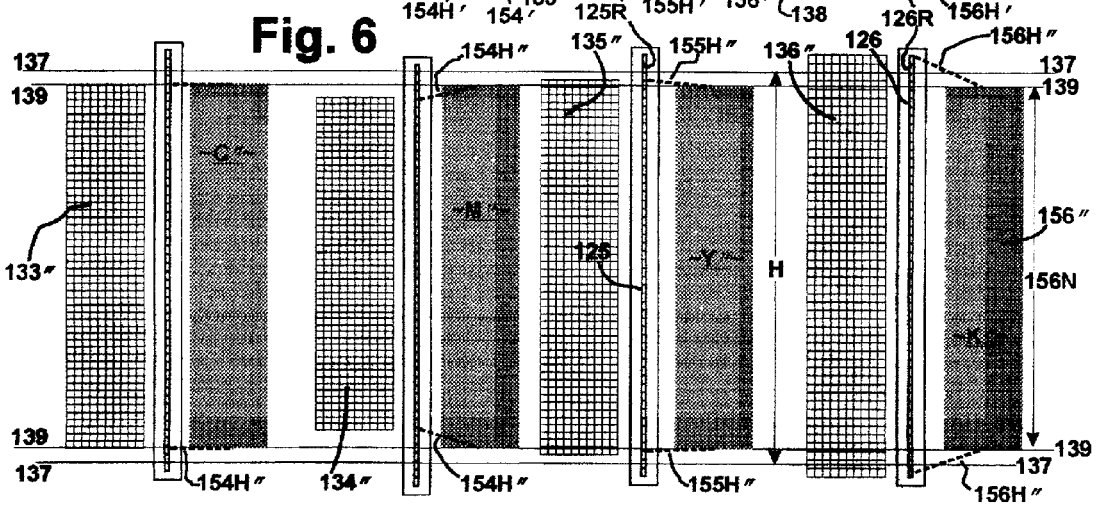

Fig. 13
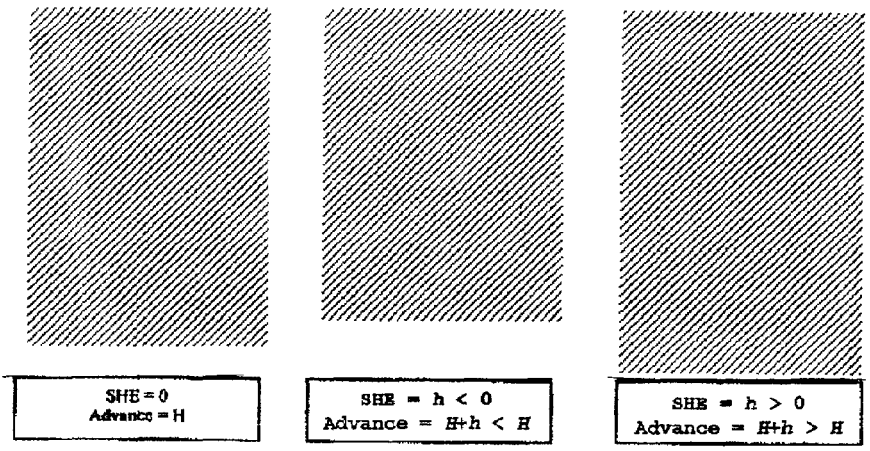
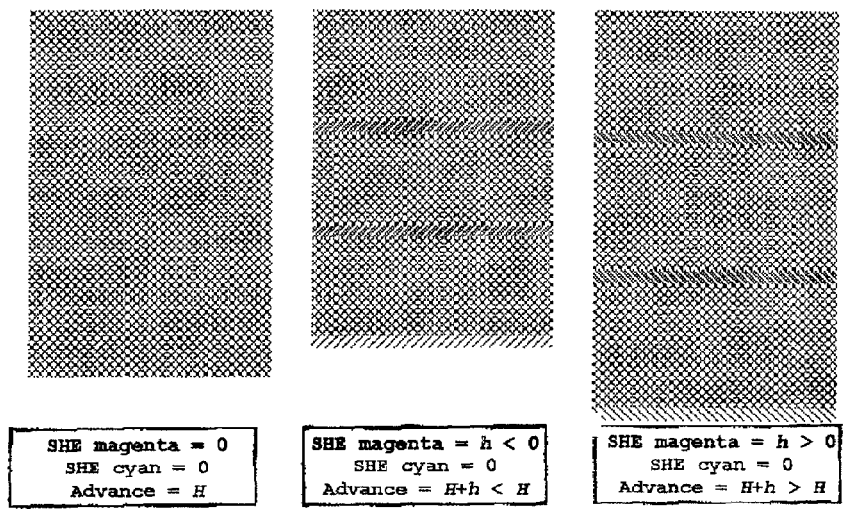
Fig. 14

APPARATUS AND METHOD FOR MITIGATING COLORANT-DEPOSITION ERRORS IN INCREMENTAL PRINTING

RELATED PATENT DOCUMENTS

Closely related documents are other coowned and copending U.S. utility-patent applications filed in the United States Patent and Trademark Office—and also hereby incorporated by reference in their entirety into this document. One is Ser. No. 09/516,007, converted to 60/219,315 and thence to Ser. No. 09/632,197, in the names of Garcia-Reyero et al., entitled "IMPROVEMENTS IN AUTOMATED AND SEMIAUTOMATED PRINTMASK GENERATION FOR INCREMENTAL PRINTING" and issued as U.S. Pat. No. 6,443,556. Another such document is provisional application Ser. No. 60/179,383, whose priority benefit was later claimed in nonprovisional application Ser. No. 09/693,524 in the names of Doval et al., entitled "COMPENSATION FOR MARKING-POSITION ERRORS ALONG THE PEN-LENGTH DIRECTION, IN INKJET PRINTING" and issued as U.S. Pat. No. 6,494,558. Still other such documents are Ser. No. 09/492,564 and Ser. No. 09/492,929 in the name of Askeland, respectively entitled "ADAPTIVE INCREMENTAL PRINT MODE THAT MAXIMIZES THROUGHPUT WHILE MAINTAINING INTERPEN ALIGNMENT BY NOZZLE SELECTION", and "ADAPTIVE INCREMENTAL PRINTING THAT MAXIMIZES THROUGHPUT BY DATA SHIFT TO PRINT WITH PHYSICALLY UNALIGNED NOZZLES"—and issued as U.S. Pat. Nos. 6,435,644 and 6,648,525 (and companion documents thereof). Yet another is Ser. No. 09/252,141 in the name of Borrell, entitled "ANTI-PATTERNING PRINTMODE FOR MATRIX-BASED SCATTERED-DITHERED IMAGES, IN INCREMENTAL PRINTING" and issued as U.S. Pat. No. 6,690,484.

FIELD OF THE INVENTION

This invention relates generally to machines and procedures for incremental printing of text or graphics on printing media such as paper, transparency stock, or other glossy media; and more particularly to a machine (e. g. inkjet printer, copier or facsimile receiver) and method that construct text or images incrementally, or in another word progressively, from individual ink spots created on a printing medium, in a two-dimensional pixel grid.

Such "incremental" printing may be accomplished by passing a single, full-page-width array (or one such array for each of plural colorants) of marking elements continuously along the length of a printing medium—or passing the length of the medium under the array. Incremental printing may instead be accomplished by passing a smaller array (or again one for each of plural colorants) across the width of the medium multiple times, in a process often called "scanning"—the medium being advanced under the scanning path or axis, between passes—to create a swath or partial swath of marks in each pass.

In present-day commercial apparatus the grid is commonly a rectangular pattern of columns and rows, but for purposes of this document need not be. For example a hexagonal pixel-grid pattern appears straightforwardly workable; and some density-related aspects of the invention would be applicable even in far more remote grid forms, e. g. polar. The invention employs diverse techniques, in some cases particularly exploiting crossover effects between coloration phenomena and dimensional phenomena, to mitigate colorant-deposition error ("CDE") and thereby optimize image quality.

BACKGROUND OF THE INVENTION

Incremental printing is based on accurate deposition of small colorant dots onto specified locations on paper or other printing media. In inkjet printing such placement takes the form of ballistic delivery of ink droplets.

Typically these mechanisms form a rectangular grid of specified resolution, the most common resolutions now being twelve by twelve, or twenty-four by twenty-four, dots per millimeter (three hundred by three hundred or six hundred by six hundred dots per inch). Other formats, however, are continuously evaluated.

At least two important mechanisms give rise to intractable difficulties in the control of CDE. As to the types of CDE associated with dot-density variations, such stringent difficulties occur even in monochrome printing.

As to the types of CDE associated with optimum print-medium-advance variations, such difficulties generally exceed available correction resources in printing that combines different color planes, most-commonly primary colors but also other color sets such as hexachrome or light colors form the images. In this case the major difficulty arises directly from the basic requirement for interrelated delivery of different colorants into common areas.

1. Error Types

For purposes of this document, CDE encompasses at least four main types of directly observable error—each of which can occur alone under some conditions, although these types are generally interrelated in complex ways:

(1) individual-element density error,
(2) swath-height error ("SWE"),
(3) area-fill nonuniformity ("AFNU"), and
(4) ink-media interactions.

The first of these refers to individual printing elements—whether or not correctly aimed—whose printed dots are either too dark or too light. In inkjet printing such error can be due to variation in drop weight, drop shape or other effects.

The second, SWE, refers to swaths that appear too tall or too shallow, most commonly regarded as due to aiming errors near the ends of the array. Some SWE effects, however, can result from density errors in those regions. (The acronym "SWE" derives from earlier popular nomenclature, "swath width error".)

The third type of error, AFNU, refers to nonuniform density in an image field that is printed in response to uniform image-data. This kind of error can result from either of the first two errors—or from aiming error not particularly concentrated at the array ends, or from an undefined complex of dot-placement attributes.

Such placement attributes most likely implicate interactions between colorant and a printing medium on which the colorant is deposited. This is the fourth category of error effects—"ink-media interactions".

(The terminology AFNU, here "area fill nonuniformity", is used in some industrial facilities to connote a more-specific type of defect—a blotchy or mottled appearance. The present inventors wish to point this out simply to avoid confusion due to these slightly different usages. AFNU as used in this document may be regarded as meaning in essence "swath fill nonuniformity".)

The effects and causes discussed above are not related to each other in rigorously the cause-and-effect ways suggested. Thus for example a cause of the third type of error, nonuniform density, can be ink-media interactions; and such interactions, for some purposes, accordingly might be better listed as a cause, rather than an effect. As will be seen shortly, precise categorization of these relationships is not significant to either understanding or validity of the present invention.

While AFNU and SWE may present themselves to a viewer as distinct matters of spatial distribution and spatial deformation respectively, in actuality what appears to be a deformation of swath height (or any other shape) can be caused by perturbed colorant distribution. In other words deformation is nested within distribution error.

2. Shortened Life of Printing Arrays

Currently multielement printing arrays (including for example "printheads" or multinozzle "pens" in inkjet printing) are discarded when they develop serious problems of any of these types—although attempts have been made to deal with SWE in particular by simply accommodating such error through modification of the distance or stroke of printing-medium advance. Premature discarding of printing arrays is very undesirable because it directly elevates the end user's operating cost.

3. Modification of Printing-Medium Advance

Trying to accommodate SWE by modifying the stroke, without more, has drawbacks. Among these perhaps the most prominent is that such modification lengthens or shortens the overall dimension of the image, in the advance direction—and accordingly in some cases the dimension of the printed sheet. This makes impossible, in general, the piecing of several images together in a regular, tidy mosaic to make a large composite image.

In plural-color printing systems, another drawback is that each different color is associated with a respective different printing array and therefore, in general, with a different SWE—requiring, in turn, a different modified stroke. Only one stroke value is possible for the overall plural-array system; hence stroke modification cannot accommodate the height errors for all the colors.

As suggested above, SWE—with a resulting banding appearance—is one particularly conspicuous consequence of inaccurate dot placement, i. e. aiming error. Placement inaccuracy also causes other forms of banding, as well as line discontinuity and roughness, and color anomalies.

There are several contributors to dot-placement inaccuracies. Some of these arise in the multielement printing arrays, and others in other portions of the printing apparatus.

Such inaccuracies can occur along the scan axis (in scanning systems) or the printing-medium advance axis, or both. Some are systematic, while some others follow random patterns.

As to aiming errors, this document focuses upon the systematic component of those errors which lies along the advance axis. A typical source of these particular aiming-error components is advance-axis directionality of individual elements in the printing array.

In inkjet printing, such misdirected elements in turn can be due to relative misalignments between an array of firing resistors (or "heaters") and an array of nozzle orifices (or "nozzle plate"). Such defects, though tiny, cause drop-ejection directionality in both the scan (when applicable) and advance axes, the latter being a particular concern of the present invention.

When manifested as SWE, these defects generate a difference h (FIG. 10) between nominal printhead height H and the actual printed swath height H+h. As the left-hand and right-hand views demonstrate, the error h—identifiable as the quantitative SWE—can be either positive (h>0) or negative (h<0, H+h<H). The center view shows the nominal condition in which the error h is zero, i. e. there is no error.

Generally, techniques of accommodating SWE by adjusting the advance stroke start with assumption of some model that explains observed banding in terms of the SWE and the stroke; such a model in effect establishes a relation between the error and the stroke.

The problem can be made more specific with an example. In attempting to print a uniform area fill (FIG. 11, left-hand view) with one printing array (printhead) in a single-pass mode, the system advances the medium—between successive passes—by a stroke equivalent to the nominal array height H.

If the printhead has a negative SWE (center view), however, then adjacent swath fail to abut; this failure leaves white streaks between consecutive swaths. Such artifacts will be called "white-streak banding".

On the other hand, if the head has a positive SWE (right-hand view) then adjacent swaths overlap; the printed image in the overlap regions appear darker. Artifacts of this second kind will be called "dark banding". As the illustrations make plain, both cases represent a large adverse impact on print quality.

Another typical source of image banding is inaccuracy in the print-medium advance mechanism. Again assuming an ideal uniform fill (FIG. 12 left-hand view), if the medium underadvances, the image contains dark banding (center view)—similar to the appearance discussed above for positive SWE.

If the medium overadvances, then what appears instead is white-streak banding (right-hand view) like that noted above for negative SWE. Either kind of advance error accumulates, so that the overall length of the printed image varies in proportion to the amount of under- or overadvance (h per pass, times a number of passes); whereas with SWE the overall image length varies only by an amount equivalent to one times h, independent of the number of passes.

Now with such a model providing a theoretical relation between SWE and stroke, prior efforts to accommodate SWE include adapting the stroke to the actual effective swath height, or in other words to take into account the SWE. Again comparing with an ideal case of zero SWE, zero stroke adjustment (FIG. 13, left-hand view), a negative SWE is accommodated by a matching stroke reduction (center view) so that the white-streak-separated swaths of FIG. 12 are much more nearly abutted and the overall fill appears much more neatly blended.

A positive SWE, conversely, is accommodated by a matching stroke increase (FIG. 13, right-hand view), so that the overlapping swaths are moved apart to very nearly just abut and again the overall fill appears much more neatly blended. Unfortunately neither increase nor reduction of the stroke can work for more than one print array at a time, if—as is generally the case—the arrays have different effective swath heights (FIG. 14).

For any specified image, however, the stroke can be adjusted to equal some sort of balanced or weighted mean of the several swath heights. This balance can take into account which color is used most in the swath, to minimize banding in that color plane.

To accomplish that, the stroke can be instead adjusted to the actual swath height of the printhead which is used most—in the specific corresponding image data file (either overall or swath by swath)—as taught by Doval, mentioned earlier. Still, when two colors must be used in equal proportions, the best that can be done is only accommodation for the average SWE.

It will be understood from the foregoing that the system need store only a very modest amount of data to accomplish these tasks. More specifically, it may be desired typically to store—for each printhead—both the effective swath height (or some parameter closely related) and the ink usage for a current swath.

In addition it is desired to store the resultant balanced- or weighted-mean swath height—i. e., one additional single number. Hence the totality of data storage for this purpose may be equivalent to a numerical tabulation that has only, say, a number of rows that equals the number of printheads—and two columns (one for effective swath height and the other for current-swath ink usage)—plus the weighted mean.

The number of printheads and therefore rows in the equivalent tabulation is nowadays most typically four, though systems with six or seven printheads are becoming common. In any event the size of the equivalent tabulation, at least currently, is less than ten by two, plus the resultant weighted swath-height value (again, just one single number).

In the course of calibration, and preparation for operation, the system in effect modifies a tabulation of this general size. The rough size of this tabulation or data array may be borne in mind for comparison with later discussions of the invention.

4. Automatic Substitutions and Weighting

As to density error, a current tactic substitutes healthy printing elements for defective ones—either directly or on a statistical, weighting basis—as is taught, for instance, in the above-mentioned earlier patent documents of Garcia-Reyero. This approach, however, has its own distinct limitations.

It requires use of multipass printmodes, which is relatively slow. If many elements behave poorly, this approach may not work or may require switching to an even slower printmode.

The weighting versions of this technique are more broadly applicable, for they allow defective nozzles to be used less than healthy ones—rather than not at all—and thereby tend to make whatever use can be made of each nozzle. As a practical matter weighting appears to be more useful in cases of misdirected elements than weak or overstrong elements.

Density errors due to elements that form too-dark or too-light marks are not corrected adequately by any prior technique—particularly not any that is usable with a small number of passes, e. g. one- or two-pass printmodes. The same is true of ink-media interactions; and the foregoing discussions also cover AFNU, whether associated with SWE or density phenomena.

As is well known, an incremental printing system establishes average density levels through processes called "rendition", which most typically take the form of either dithering or error diffusion. Dithering employs a relatively large dither mask or rendition matrix—a much larger numerical data tabulation than the effective tabulation discussed above as to SWE management.

The dither mask is substantially greater, ordinarily, than a ten-row-by-ten-column table; however, it is set at the factory and ordinarily undergoes no modification in the field. This too may be borne in mind for comparison with later discussion of the invention.

5. Cost

Furthermore, these several limitations of corrective techniques known heretofore are present even though multielement printing arrays are subject to relatively stringent manufacturing tolerances and therefore relatively expensive. Manufacture and use of printing arrays (inkjet pens etc.) could be considerably more economical if the printing apparatus and methods were significantly more tolerant of both aiming and density errors, as well as ink-media artifacts.

6. Conclusion

Inadequate management of the four main error types introduced above has continued to impede achievement of uniformly excellent incremental printing—at high throughput—on all industrially important printing media. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is apparatus for printing desired images on a printing medium, based upon input image data. The apparatus prints images by construction from individual marks formed in a pixel grid.

The apparatus includes at least one multielement incremental-printing array that is subject to colorant-deposition error ("CDE"). The apparatus includes some means for measuring such colorant-deposition error of the at least one array. For purposes of generality and breadth in discussion of the invention, these means will be called simply the "measuring means".

As will be evident to people of ordinary skill in this field, at least the first three above-introduced types of CDE can be measured directly by automatic equipment incorporated into the printing apparatus. CDE of the fourth type may be most often measured through its observable effects upon AFNU, but can then be isolated through correlation, with known swath-boundary positions.

The apparatus also includes some means for modifying a multicolumn, multirow numerical tabulation that forms a mapping between such input image data and such marks, to compensate for the measured colorant-deposition error. For purposes of these modifying means only, and particularly the appended claims related to these means, the prefix "multi-" is hereby defined to mean "more-than-ten-".

In other words, "modifying a multicolumn, multirow numerical tabulation" means modifying a tabulation that has, in each dimension or direction of the array, more than ten lines of data. This criterion diverges plainly from the data assemblage of seven-by-two or less that is automatically modified in the field to accomplish SWE adjustment; it also diverges from the larger data assemblages used for dithering, in that the apparatus does not modify these.

These means, again for breadth and generality, will be called the "modifying means". (It will be understood that if no error is found, in an individual case, then no actual modification is required to satisfy this definition.)

In addition the apparatus includes some means for printing using the modified mapping. These, once again for the same reasons, will be called the "printing means".

The foregoing may constitute a description or definition of the first facet of the invention in its broadest or most general form. Even in this general form, however, it can be seen that this aspect of the invention significantly mitigates the difficulties left unresolved in the art.

In particular, the invention is an extremely powerful one because it enables compensation of any or all of the very troublesome colorant deposition errors outlined above, merely by modification of a relatively large mapping—in other words, changing a large but simple tabulation—that connects the input data to the output markings. Furthermore, in many cases, as will be seen the mapping is a preexisting tabulation and straightforwardly edited by a simple automatic procedure.

Although this aspect of the invention in its broad form thus represents a significant advance in the art, it is preferably practiced in conjunction with certain other features or characteristics that further enhance enjoyment of overall benefits.

For example, it is preferred that the mapping be either:
an optical-density transformation of the image data to such construction from individual marks; or
a spatial-resolution relationship between the image data and the pixel grid.

The mechanics of these specific techniques will be clarified below.

In regard to these two mapping types respectively, it is also preferred that the optical-density transformation include a halftoning matrix; and that the spatial-resolution relationship include a scaling of the image data to the pixel grid. It may now be seen that "modifying a multicolumn, multirow numerical tabulation" encompasses modification of either a relatively large dither mask (not heretofore modified by the apparatus in the field) or the even much larger image-data tabulation itself (not heretofore modified to correct swath-height error).

Another basic preference is that the "at least one" multielement incremental-printing array in fact include a plurality of multielement printing arrays that print in a corresponding plurality of different colors or color dilutions. Each multielement printing array is subject to a respective colorant-deposition error.

The measuring means and the modifying means each operate with respect to each one of the plurality of multielement printing arrays respectively. (In this case, once again no actual correction need be made to satisfy this definition, when operation of the measuring means finds no error.)

A further preference applies to such a multielement embodiment when the colorant-deposition error includes a respective pattern of printing-density defects for at least one of the plurality of multielement printing arrays. Here the measuring means measure the pattern of printing-density defects for each multielement printing array respectively. Correspondingly the modifying means apply the respective pattern of density defects, for at least one of the multielement printing arrays, to modify a respective one of said mappings.

An analogous preference applies to a multielement embodiment, when the colorant-deposition error includes a respective swath-height error, for at least one array. In this case the measuring means measure the swath-height error for each array respectively; and the modifying means apply the respective swath-height error, for at least one array, to modify a respective mapping.

Another basic preference applies when the colorant-deposition error includes a pattern of printing-density defects. Here the measuring means measure the pattern of printing-density defects, and the modifying means include:
means for deriving a correction pattern from the measured pattern of printing-density defects, and
means for applying the correction pattern to modify a halftone thresholding process.

The printing means then print the image using the modified halftone thresholding process.

As will now be clear to people of ordinary skill in this field, this preferred form of the invention is compatible with the plural-array preferences discussed above. The same is true for an analogous basic preferred form, in the case of colorant-deposition error that includes a swath-height error—or that corresponds to an otherwise-generated optimum distance for advance of the printing medium.

Here the measuring means measure the swath-height error or determine the optimum distance, and the modifying means comprise:
means for deriving a correction pattern from the measured swath-height error, and
means for applying the correction pattern to modify a halftone thresholding process.

In this case the printing means print the image using the modified halftone thresholding process.

In preferred embodiments of a second primary facet or aspect, the invention is not an apparatus but rather a method of printing a desired image. The image is printed by construction from individual marks formed in a pixel grid by at least one multielement printing array.

The array is understood to be subject to a pattern of printing-density defects. For purposes of this document, such a "pattern" may encompass effects which a particular printed swath exerts upon adjacent swaths—i.e. a preceding swath and a following swath—including, but not limited to, ink-media interactions at and near the swath boundaries.

The method includes the steps of measuring such a pattern of printing-density defects, and then deriving a correction pattern from the measured pattern of printing-density defects. The method also includes the steps of applying the correction pattern to modify a halftone thresholding process, and printing the image using the modified halftone thresholding process.

The foregoing may constitute a description or definition of the second facet of the invention in its broadest or most general form. Even in this general form, however, it can be seen that this aspect of the invention, too, significantly mitigates the difficulties left unresolved in the art.

In particular, use of a correction pattern that is derived directly from a measured pattern of density defects has striking benefits. This is a form of direct negative feedback that, in its best implementations, enables extraordinary precision in the cancellation of such defects.

Although this second aspect of the invention in its broad form thus represents a significant advance in the art, it is preferably practiced in conjunction with certain other features or characteristics that further enhance enjoyment of overall benefits.

For example, where the method is for use with a printmask in plural-pass printing, it is preferred to include two additional steps, before or as a part of the applying step. These steps are: using the printmask to determine a relationship between the halftone thresholding process and the multielement array, and employing the relationship in the applying step to control application of the correction pattern to the halftone thresholding process.

The point is that the present invention aims to adjust the halftone thresholding in a way that is always respectively consistent for each differently functioning element (e.g. inkjet nozzle) of the printing array—but the halftone thresholding process is directly associated only with the image grid. This association is decoupled, in plural-pass printmodes with printmasks, from the printing array.

The printmask provides the intermediate mapping between the image grid and the printing array, a mapping which typically changes from pass to pass. The printmask-using step simply identifies which cell of the halftone thresholding process has the thresholding value for each particular element of the multielement printing array, respectively.

The procedure builds an identity map of the multielement printing array, through the printmask, into the halftone thresholding process, thus customizing the thresholding process for each pass. Except in the case of randomly varying printmasks, usually masks are reused many times in a known sequence; therefore the customized matrices are reusable many times down the page, though not usually in immediately succeeding passes.

Another preference applies when the "at least one" multielement incremental-printing array actually is a plurality of multielement printing arrays that print in a corresponding plurality of different colors or color dilutions. In such cases each multielement printing array is commonly subject to a respective pattern of printing-density defects; and preferably the measuring, deriving, applying and printing steps of the invention are each performed with respect to each multielement printing array respectively.

In such cases, in transverse-scanning systems of the sort mentioned earlier it is common for each array also to be subject to a respective swath-height error. In this situation the measuring, deriving, applying and printing steps are also used to modify swath height of each multielement printing array, for accommodating the swath-height error of each multielement printing array respectively.

Twin preferences as to the character of the halftone thresholding process are that it include definition of either a halftone matrix or an error-diffusion protocol. In the latter case, that protocol includes either a progressive error-distribution allocation protocol of the error-diffusion halftoning, or a decisional protocol for determining whether to mark a particular pixel—or preferably both.

As to the character of the applying step, there are three selectable options for use in that step. It may include replacing values above or below a threshold value, or multiplying values by a linear factor, or applying a gamma correction function to values—or combinations of any two or more of these options.

The best single option is the gamma function. While the others are useable, a gamma function is best because it can be made linear in perceptual terms with the visual response of the eye.

Therefore with a gamma function the invention can avoid overcorrecting—e. g., converting an objectionable dark line to an objectionable light line—or undercorrecting. Thereby the operation of the invention can be better matched to a variety of image densities.

Yet another preference is that the printing stage include single-pass printing. In most but not all such cases the earlier-discussed intermediate mapping stage vanishes, as typically the halftoning matrix is maintained in step with a multielement printing array throughout an entire image.

In an event it is particularly preferable to select some operating strategy that maintains a one-to-one mapping between the halftone thresholding process and each of the printing arrays. This enables a preferable simplified form of the invention—namely, that for each of the plurality of multielement arrays, the measuring, deriving and applying steps are each performed at most only one time for a full image.

In preferred embodiments of a third basic facet or aspect, the invention is again a method of printing a desired image, based on input image data. The printing occurs by construction from individual marks formed in a pixel grid by at least one scanning multielement printing array.

The printing is subject to print-quality defects due to departure of printing-medium advance from an optimum value. These defects commonly take the form of swath-height error (SWE), but can instead appear as area-fill nonuniformity (AFNU)—both introduced earlier. Either of these forms, as also noted above, can in turn be due to print-element aiming errors, or to ink-media interactions or other colorant-deposition attributes (whether or not known), or even to simple density errors.

The method includes the steps of measuring a parameter related to such print-quality defects, and scaling the input image data to compensate for said departure. It also includes the step of printing the image using the scaled input image data.

The foregoing may represent a description or definition of the third aspect or facet of the invention in its broadest or most general form. Even as couched in these broad terms, however, it can be seen that this facet of the invention importantly advances the art.

In particular, the errors may or may not occur due to aiming or other malfunctions plainly related to any scale of the image data—but may instead be due to inaccurate density or complex matters of ink and media, or may even be wholly unknown. Yet the invention is able to greatly mitigate them by adjusting the scale of the data.

Thus the invention recognizes and exploits crossover effects between dimensional and coloration phenomena. This observation refers to crossover between (1) dimensional phenomena such as aiming, swath height, and scaling, on the one hand, and (2) coloration phenomena such as density, ink-to-media, and other deposition occurrences, on the other hand.

Although the third major aspect of the invention thus significantly advances the art, nevertheless to optimize enjoyment of its benefits preferably the invention is practiced in conjunction with certain additional features or characteristics. In particular, preferably the measured parameter includes either the print-quality defects themselves, or the optimum medium-advance value.

Thus if the parameter includes the print-quality defects, the measuring step includes measuring the print-quality defects—i. e., measuring swath-height error, or area-fill nonuniformity. In the latter case of measuring AFNU, it is preferred to measure the nonuniformity as a function of advance value.

That is to say, the measuring step includes using a sensing system to measure AFNU for each of plural printing-medium advance values—and then going on to select a particular advance value that corresponds to minimum nonuniformity. It will be recalled that the causality which relates advance value to AFNU may not be entirely known; yet the method selects an advance value that is best, independent of causality.

An alternative way of describing this dual measurement, but without specific reference to AFNU or any other individual error type, is simply to say that the parameter to be measured includes the optimum value. The measuring step, then, includes determining the optimum value.

Another preference is applicable when the "at least one" scanning multielement printing array includes a plurality of multielement printing arrays that print in a corresponding plurality of different colors or color dilutions. Each multielement printing array is subject to a respective optimum advance value, and here preferably the measuring, deriving, applying and printing steps are each performed with respect to each multielement printing array respectively.

In this case the printing step preferably includes comparing optimum advance values measured for the plurality of multielement printing arrays respectively, to find the smallest of the optimum advance values (or the smallest of the effective swath heights for the plurality of arrays). This step further includes selecting a particular array whose optimum advance value (or swath height) is substantially the smallest.

Then the printing step also includes using—in common for the plurality of printing arrays—substantially that selected smallest optimum advance value. It also includes, for substantially each array other than that particular array, operating with a respective reduced number of printing elements and with rescaled data, to match an actual effective swath height of the particular array. In other words, the smallest swath height or smallest ideal value becomes the keystone to the plural-color printing assemblage, and the remaining arrays are accommodated to that keystone.

All of the foregoing operational principles and advantages of the present invention will be more fully appreciated upon consideration of the following detailed description, with reference to the appended drawings, of which:

BRIEF DESCRIPTION OF THE DRAWINGS

FIG. 1 is a simplified composite diagram, highly schematic or conceptual, for four companion printheads and showing relationships between nozzle geometries, nozzle drop-ejection profiles, inking-density profiles, and area-fill nonuniformities;

FIG. 2 is a like diagram but showing relationships between inverse inking-density profiles (derived from the FIG. 1 density profiles), standard dither matrices and modified dither matrices;

FIG. 3 is a like diagram but showing usage of the FIG. 2 modified matrices in printing compensated, uniform area fills using the FIG. 1 nozzles;

FIG. 4 is a diagram like FIG. 1 but showing relationships between data, nozzle geometries and printed swaths with (in some cases) height errors;

FIG. 5 is a like diagram but showing relationships between the FIG. 4 nozzle geometries, data corrected for the FIG. 4 errors, and (in most cases) compensated, printed swaths with proper heights;

FIG. 6 is a like diagram but showing data corrected according to a more elaborate protocol and (in all cases) compensated, printed swaths with proper heights;

FIG. 13 is a like representation of SWE accommodation by matching with the same three stroke values in the same order; and FIG. 14 is a like representation of SWE-accommodated plural-swath image segments for diverse printing arrays (zero-SWE cyan in all three views—printed with magenta SWE zero at left, negative in the center view and positive at right).

DETAILED DESCRIPTION OF THE PREFERRED EMBODIMENTS

Figure 7:
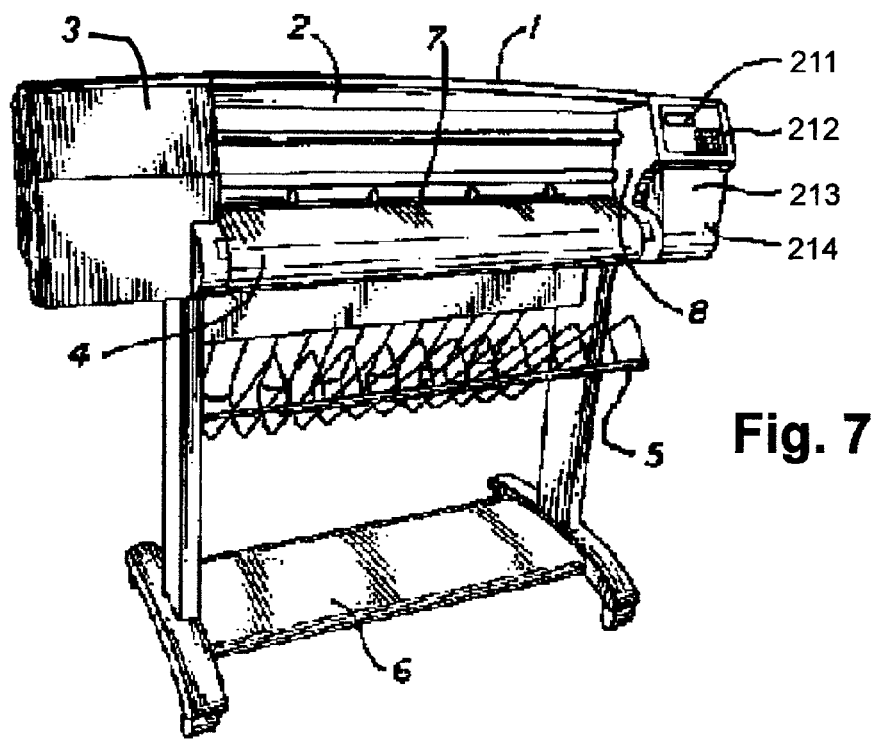
FIG. 7 is a perspective view of the exterior of a printer embodying preferred embodiments of the invention.

1. Density and "SWE" Correction by Modified Matrix (a) The internal-banding problem—Preferred embodiments of the modified-matrix forms of the invention can reduce artificats 53D, 53L, 54D, 54L (FIG. 1) due to drop-weight variation, optical-density variation (from shifts in drop shape and other factors as well as weight), ink/media interactions at boundaries; and also swath-height error 45H, 46H, without affecting page length. These include artifacts due to weak or misdirected nozzles, though for the latter these forms of the invention are not the best method.

Consider a set of representative printheads or "pens" 223-226, assumed to have particular nozzle arrays 23-26 respectively for printing in different colors e. g. cyan C, magenta M, yellow Y and black K—each with its own respective specific profile 33-36 of ink ejection, or in other words inking intensity. (For present purposes each nozzle is considered together with its respective firing resistor and all associated effects.)

The profile 33 for the cyan pen 223, for example, can be measured by a drop detector when the pen is instructed to eject inkdrops corresponding to e. g. a forty-percent area fill. Ordinarily a simple drop detector measures ink ejection as a function of nozzle number, or location along the nozzle array, without responding to aiming accuracy.

Where the nozzles 23 would make a printout that is too dark, the resulting measured drop-detector profile 33 may include some regions 33D corresponding to nozzle groups ejecting the equivalent of a fifty-five-percent area fill (note scale markings at top of diagram). Where the printout would be too light, the profile may include other regions 33L corresponding to other nozzle groups that produce flows measuring the equivalent of a twenty-five- or even just ten-percent area fill.

Instead of a drop detector, a sensor can be scanned along the advance axis over an actual single-pass printed swath of the commanded area fill, to record the image-density profile 43 in the cyan area fill 53. Unlike a drop detector, a scanned sensor is capable of measuring aiming accuracy as well as tonal level or intensity. For the cyan case assumed here, however, nozzle misdirection is not significant and the density profile 43 accordingly tracks the drop-detection profile 33—i. e. with dark regions 53D and light regions 53L.

(b) Defeating the assumptions that underlie rendition—Although not shown in FIG. 1, the printing of an area fill 53 by a nozzle array 23 is usually performed through some rendition process such as application of a dither mask to a uniform field of data points at a specified density. The dither mask, or a thresholding hierarchy for use in error diffusion, is established at the factory under the assumption that the nozzle array ejects a uniform pattern of inking intensity along the nozzle array in response to a uniform instruction set.

In a binary system, such a set of instructions is typically "fire all nozzles" or "all nozzles on"—here no dither mask need be involved—and the assumed result is a uniform one-hundred-percent (fully saturated) line or field of cyan. In an inking-intensity drop-detector profile, i. e. a plot of inking intensity vs. nozzle number (position along the array), this would produce a straight line at one hundred percent.

After dithering to a commanded forty-percent area fill, instead, the result should still be a straight line, because of the statistical effects of the dithering process—but no longer at one hundred percent. The straight line now should lie along the "40" inking-intensity line in the drop-detector profile, and the printed image-density profile should follow suit. The overall system transfer function, from data in to printed image out, should be uniform along the array of nozzles or other printing elements.

Thus the varying actual inking-intensity profile 33 assumed here for the specific array 23 defeats the assumptions behind the establishment of the dither mask or error-diffusion thresholding structure. This is the cause of the artifacts 53D, 53L—and is one major problem that the present invention undertakes to solve.

(c) Modifying rendition to recapture the assumed transfer function—The preferred modified-matrix embodiments of the present invention essentially create, during halftoning, an overlay of perturbations that will be applied to the image data in halftoning—and as a result the same pattern of effects carries forward into printing. The perturbations compensate for known error effects 33D, 33L at the printhead and corresponding effects 43D, 43L in a sensor profile 43.

This can be roughly conceptualized as creation of a kind of inverse function 43' (FIG. 2), i. e. an inverse of the sensor profile 43—although for certain reasons this conceptualization is oversimplified as will be seen. In some sense, however, the measured profile 43 (or 33) is carried forward 47 into formation of its inverse 43'.

This inverse function 43' is then applied to a conventional dither mask 48—also marked "M(ij)" in the drawing—to create a new, customized dither mask 143, also marked "$M_c$(ij)". This modified matrix 143 is maintained 49 for subsequent use in printing (FIG. 3) with its corresponding particular nozzle array 23.

Analogous modification can be introduced for error diffusion. As in the discussion above, decision-threshold changes or error-distribution reallocations must be contoured on a linewise basis—that is, customized for each nonuniform pixel row.

(d) Modification for internal banding—The modified dither mask 143 has regions 143L, precisely localized to the dark regions 53D of the area fill 53, that will lighten an output printout C' (FIG. 3). It also has regions 143D, localized to the light regions 53L of the area fill, that will darken the output printout C'.

Thus to the extent that the function 43' can be made an effective inverse of the drop-detector or sensor profile 33, 43 for the specific nozzle array 23, the modified matrix 143 substantially eliminates variations introduced by the nozzle-array nonuniformities 33D, 33L and thereby enables the system to produce a substantially uniform area fill C'. The assumed uniformity or regularity of the overall system transfer function has been restored.

For example, suppose that a particular nozzle is firing too strongly and thereby producing dots 33D that are too large and thus appear too dark 43D. The overlay of perturbations 143L systematically shifts the average density per unit area to more nearly match that of normally functioning neighboring nozzles.

In some printing technologies this can be accomplished by actually changing the size, darkness or density of individual dots or other marks that are produced by individual nozzles—e. g. by increasing a suitable ejection parameter such as ejection energy or drop volume. In such systems, all the dots printed by a particular overinking nozzle can be adjusted toward lower darkness (i. e. lighter) levels by calling for slightly smaller inkdrops.

In thermal-inkjet products of designs currently provided by the Hewlett Packard Company, such individual firing adjustments are not readily accessible (although they are plainly possible in principle), and the technique instead proceeds by reducing the average number of dots printed by each overinking nozzle to compensate for its variant density. What is adjusted is thus the "spatial density" of dots, i. e. marking them farther apart than the nominal.

By printing a lesser number of overly dark drops, it is possible to produce a similar average density per area as the normally functioning neighboring nozzles—e. g. for any given particular tonal level. Conversely a nozzle that is underinking, i. e. weak, is compensated by raising the energy or drop volume etc. in systems that enable such adjustment—or by increasing the average number of dots printed by that nozzle.

As suggested above, however, it is not always practical to make the compensation function 43' an effective inverse of the drop-detector or sensor profile 33, 43. As will be seen, this ideal is sometimes obstructed to varying degrees by several factors including second-order effects, range limitations, processing-power or storage-capacity considerations, and the desirability of nonlinear corrections to accommodate ink-media interactions.

(e) Independent correction for each pen—The preferred embodiment presented above is preferably applied to each printhead independently. Thus for example the cyan nozzle array 23 has a companion magenta array 24, with an inking-density profile 34 (FIG. 1) that is entirely different from the above-discussed cyan-array profile 33.

The magenta array 24 may for example have nozzle groups whose divergence 34D from the nominal toward the dark end of the inking-intensity scale is more extreme than seen for cyan, and other groups whose divergence 34L toward the light end of the scale is analogously more extreme. Accordingly, the corresponding artifacts 54D, 54L seen in an area fill, and measured in a sensor profile 44, likewise may be more severe.

When the sensor profile 44 is carried forward 47 to an inverse function 44' (FIG. 2), and this inverse is applied to the standard matrix 48, a new and wholly different modified matrix 144 or "$M_M$(ij)" results. The pattern of dark-producing regions 144D and light-producing regions 144L is keyed in both intensity (i. e. more extreme) and location to the light regions 54L and dark regions 54D in the measured area fill 54. Again when carried forward 49 to later printing (FIG. 3) with the magenta array 24, the variations are substantially canceled out and the system can produce a more-uniform area fill M'.

(f) The SWE problem—Different kinds of examples are presented for the yellow and black nozzle arrays 25, 26 (FIG. 1). For simplicity's sake it is assumed here that these arrays have no dark- or light-printing nozzles but do have significant swath-height error 45$h$, 46$h$.

In particular, in this example for the yellow array 25 the nozzle inking profile 35 is a rectangular function that appears perfect. An area-fill swath 55 printed in yellow Y, however, for this example extends along the advance axis too far in the positive direction by the error distance 45$h_1$ and also in the negative direction by a slightly larger distance 45$h_2$.

Thus for the exemplary array 25, the swath-height error SWE is positive, and is equal to the sum 45$h_1$+45$h_2$. Such artifacts are understood to arise from paper-advance-axis directionality (PAD) error, as discussed in e. g. the Doval document noted earlier. This is another major type of problem that the present invention undertakes to solve.

In the prior art—due to the relative difficulty of managing the unequal components at the two ends—the SWE is usually treated as symmetrical. Sometimes it is suggested in such situations to deal with the asymmetry as part of interpen alignment by aligning the centers of the overall extended swaths rather than the centers of the pens.

Preferred modified-matrix embodiments of the present invention handle each component of positive SWE independently without incorporating SWE considerations into the alignment. (In purest principle at least, interpen alignment can be incorporated into these embodiments of the invention.)

The image-density profile 45 is, like the drop-detector profile 35, also a rectangular function—but like the area-fill swath 55 is too long. The dashed lines 45$h_1$, 45$h_2$ representing outboard extension of the drop-detector profile 35 to the swath 55 may be conceptualized as part of the SWE function 45.

(g) Matrix modification for SWE—It is this composite function whose inverse 45' (FIG. 2) is carried forward 47 into the correction process. The inverse function 45' is thus a swath-height contraction as illustrated. Application of this inverse 45' to the standard dither matrix 48, M(ij) therefore produces a custom matrix 145 in which proportionally length-reduced top and bottom regions 145H$_1$, 145H$_2$ are entirely suppressed.

Like the image-lightening regions 143L, 144L discussed above for the cyan and magenta pens, these two end regions 145H$_1$, 145H$_2$—when carried forward 49 to the printing stage (FIG. 3)—suppress printing of the affected portions of the swath. They thus compensate for unwanted dark printing.

In this case the "unwanted dark printing" is all of the printing which extends beyond the nominal swath boundaries. Therefore the end-clipped custom dither mask 145 entirely eliminates the overextended top and bottom edge regions 45$h_1$, 45$h_2$ (FIG. 1), or in other words trims the top and bottom edges of the yellow swath Y' (FIG. 3) to the nominal boundaries.

In practice, SWE effects such as illustrated for the yellow and black arrays 25, 26 occur in conjunction with the dark and light internal banding effects illustrated for the cyan and magenta arrays 23, 24. Superposition of such effects is straightforwardly handled by superposing the two kinds of corrective strategies that have now been introduced.

In particular the rectangular corners of the extended-swath image profile 45 may be somewhat unrealistic. In actuality many pens with SWE may exhibit a tailing-off effect in the extension regions—which would be better represented by rounded corners at the ends of the profile.

Compensation for such varied-density end regions is readily treated by exactly the technique discussed above for the light regions 53L, 54L. Such SWE contouring would be extremely difficult to achieve by the prior-art accommodations, and perhaps impossible by the data-scaling methods detailed later in the present document.

(h) Limitations, for positive SWE—Unlike prior-art methods that distort the overall image to include all the image data that are printed beyond the nominal swath dimensions, preferred modified-matrix embodiments of the present invention instead discard portions of the image to maintain nominal swath dimensions. Thus whatever parts of a picture happen to fall within the shallow top and bottom strips 45$h_1$, 45$h_2$ are jettisoned when printing is suppressed in the corresponding end-clipped shallow regions 145H$_1$, 145H$_2$.

It will be understood that the heights of these regions are exaggerated in the diagrams, and ordinarily only e. g. fewer than one percent of nozzles are affected in this way. In some unusual instances, nevertheless, significant image details may be misrepresented due to this effect.

The techniques described here are also subject to second-order effects—nonlinearity in the swath-height error—that can degrade the results. In particular, if the overall swath-height error is, say, exactly one percent of the swath height, the foregoing analysis would suggest that just over one percent (1/99) of the nozzles (1/198 at each end, for instance) should be disabled.

Because of the particular hardware variations (in at least some generations of nozzle arrays) that cause PAD error and thereby cause SWE, however, it is likely that the error is concentrated in nozzles at the extreme ends of the array. Hence the remaining ninety-nine percent of nozzles are likely to be aimed much more accurately, and disabling 1/99 of the nozzles may leave the nominal swath edges unprinted. Hence an iterative protocol of measurement, modification, remeasurement and remodification may be required to achieve a near-optimum trim for the positive-SWE case under discussion.

(h) Limitations, for negative SWE—Limitations in this case can be still more severe, as suggested for the black-printing array 26 (FIG. 1). In this situation a drop-detector profile 36 appears essentially like that 35 for the yellow pen—but the printed swath 56 is shallower, not taller, than nominal.

Correspondingly the sensor-measured density profile 46 too is shallower. For the illustrated example, the shortfall 46$h_1$ at the top of the swath is significantly greater than that 46$h_2$ at the bottom.

Here the characteristic of the SWE function appears as inward-contracting dashed lines (also labeled with the same values 46$h_1$, 46$h_2$). Hence when carried forward 47 to form an inverse function 46' (FIG. 2), the characteristic dictates that the inverse be expanding outward.

This outward-expanding inverse function 46' in theory can be applied to the standard matrix 48, M(ij) as before. The resulting theoretical geometry, however, is without literal physical meaning since the new dither mask 146 by definition cannot extend beyond the physical length of the nozzle array 26.

What can be done is to implement the desired additional inking within that physical length, as for instance by calling for extra heavy inking in a shallow strip 146H$_3$ just inside the lower edge of the new matrix 156, M$_K$(ij). Because the unadjusted shortfall 46$h_2$ (FIG. 1) at the bottom edge of the exemplary swath 56 is only very slight, ink-media effects operating on this surplus ink at 146H$_3$ can yield a close approximation to a neatly extended lower swath boundary as suggested at the bottom of the adjusted black swath K' (FIG. 3).

Such ink-media effects may include an outboard (i. e. here downward) expansion of the heavy inking into uninked portions of the printing medium. They may also include persistence of this inking as liquid for a long enough time to coalescence with analogously deposited extra ink at the top of the next swath, and thereby form a nicely blended swath interface.

The example, however, as noted earlier also includes a significantly more extreme shortfall (negative SWE) 46$h_1$ at the top edge of the swath. It may be impossible to deposit enough extra ink along the upper edge of the swath to blend the swaths together in the way suggested for the bottom edge—particularly without producing an undesired darkening within the top edge of the swath, on account of migration and coalescence within as well as just outside the swath.

To an extent, such effects may be mitigated by forming the surplus inking in bands of different density—e. g. a maximum-density strip 146H$_1$ immediately inside the top edge and a slightly lighter band 146H$_2$ just inboard from that high-density band. Even with best techniques, nevertheless, a residual negative SWE effect ΔH (FIG. 3) may persist.

In addition, comments analogous to some of those above for positive SWE apply here too. Thus the extra inking that flows outside the physical limit of the nozzle array 26 represent replication or expansion of image detail that is just inside that limit—and so represent a deformation of the image.

(i) *Arithmetic of the modification*—As indicated earlier, the perturbations of these preferred embodiments are injected into the printing process by modifying a thresholding function—which may e. g. be either a halftone matrix (dither mask) in dithering, or a structure of threshold values used in error diffusion. By way of review, a halftone matrix is a thresholding array used to express multibit color data in binary or plural-bit form, and is typically used to determine dot locations in inkjet and other incremental printing.

More specifically, a halftone matrix is used that has the same height (expressed as a number of rows) as the printing-element array or printhead (e. g. pen) has elements (e. g. nozzles)—or, if halftoning at lower resolution than the printhead resolution, a number of rows corresponding to the physical print swath size (length in the medium-advance direction). This matrix can be a smaller matrix repeated to form a matrix of the required size.

As explained below, the invention can be implemented for a printmode with one pass—or, more generally, a printmode in which the advance is always equal to the printing-element array height. For printmodes with fractional advances (i. e. most multipass printmodes) an additional step is required to determine which nozzle of the printing-element array corresponds to each cell of the halftone matrix before the appropriate correction constants can be determined.

Each row of the halftone matrix is recalculated based upon input correction values that characterize the defects present in the printhead. Experimentation has explored three techniques: replacing all values above or below a threshold value, multiplying a row by a linear term, and using a gamma correction function on the row.

(j) *Single-pass printmodes*—Let M(ij) represent an element of a halftone matrix that is i by j in size, where i represents a column index and j a row index for each element; and let M'(ij) represent the new matrix. With these notations, the techniques of the preferred embodiments may be written as follows, starting with single-pass printmodes.

Threshold method:
if M(ij) is greater (less) than a threshold t(j) for row j, then M'(ij)=0 (or other specific value);
otherwise M'(ij)=M(ij)

Linear correction:
M'(ij)=a(j)·M(ij)

Gamma correction (assuming a matrix normalized to one):
M'(ij)=M(ij)+a(j)·M(ij)$^{b(j)}$ Of these three techniques, the most successful basic formula has been the gamma function. The coefficient a(j) is an intensity control on the correction, a value between −1 and +1 indicating the fraction of correction desired.

As an example, 0.5 causes a maximum change (disregarding for now the effects of the exponent b) of half the original value. When the resulting values of M' are inserted into the dither matrix—shifting the thresholds that determine whether dots are printed—a positive value of a(j) raises thresholds and thereby produces a halftone in which fewer dots are printed, and a negative value lowers the thresholds and to produces one in which more dots are printed.

The exponent b(j) is a linearization control, causing the correction to be stronger in light or dark areas. Typical values to linearize inks perceptually are around 1.7 to 2.5.

The gamma function as presented above assumes values scaled from zero to unity, while most halftone data consist of values scaled from zero to 255. To adapt the gamma function, the old value is first normalized to the range zero through unity, and then the result multiplied by 255 to rescale it to the data range:

$$M'(ij) = 255\left[M(ij) + a(j) \cdot \left(\frac{M(ij)}{255}\right)^{b(j)}\right].$$

Depending on the values of a(j), b(j) and M(ij), the new value may exceed 255. In most such cases for practical reasons (such as memory efficiency) advantageously the value is simply clipped to 255.

Since source image data generally is eight-bit (values of zero through 255), in many systems a thresholding value greater than 255 will not behave differently than a value of 255. Thus in such systems there is no practical difference between clipping to 255 and leaving the value unedited. (The contrary is the case, however, in systems that treat values above 255 merely by suppressing a further binary place—i. e. a most-significant ninth bit.)

To create an adjusted halftone, a(j) and b(j) values are specified for each row of the halftone matrix. Usually the same b value can be used for all rows, and the a value corresponds to an amount by which each row should be changed.

For automatic operation in the field, the a values may be set in response to measured deviation of ink level at the position of each printing element or group, e. g.

$$a(j) = \frac{\text{measured tonal value}}{\text{commanded tonal value}}.$$

Each cell of the halftone is recalculated using the corresponding a and b values for that row of the halftone.

The other above-mentioned methods are less desirable. A linear correction, in particular, tends to overcorrect in light image areas; while a thresholding model corrects only very dark image areas, and rather imprecisely—but can be useful for swath-bleed situations. With the guidance of these stated relationships, combinations of the formulas introduced above—or other correction formulas—can be used instead.

In any event the resulting halftone matrix M' is advantageously used to halftone image data, introducing the pattern of density corrections into the printing pipeline. The equalizing effects flow through to the end and occur in the resulting printed image.

The halftoning should begin with the top row of the image being halftoned, and with the matrix row corresponding to the nozzle that will be used to start printing. Usually these are rows "1" and "1", respectively, in a single-pass printmode.

(k) *Multipass printmodes*—For multipass printmodes, the halftone matrix is further constrained to be an integral multiple of the width of the printmask. (This condition is counter to some antipatterning principles taught in the previously mentioned Borrell document; in event objectionable pattern effects arise, an accommodation with those principles should be considered.)

In this case an additional matrix N(ij) should be constructed, containing values representing the nozzle that will be used to print each cell of the halftone. Depending on the complexity of the printmode, this additional mapping matrix can be created either manually or by straightforward calculations; it is used as follows.

Threshold method:
 if M(ij) is greater (less) than threshold t(N(ij)), then
  M'(ij)=0 (or other specific value);
 otherwise M'(ij)=M(ij)
Linear correction:
 M'(ij)=a(N(ij))·M(ij)
Gamma correction (assuming a matrix normalized to one):
 M'(ij)=M(ij)+a(N(ij))·M(ij)$^{b(N(ij))}$ As before, halftoning should begin with the top row of the image being halftoned, and with the matrix row corresponding to the nozzle that will be used to start printing. Now, however, the latter matrix row is likely to be some row other than "1". Printing techniques that use unusual advances in certain regions of a page, e. g. at top and bottom, may not work optimally with these embodiments of the invention—at least within those page regions.

As noted earlier, these embodiments are not limited to the kind of rendition known as dithering, but rather can be applied to other rendition types as well—particularly to error diffusion. For example, the N(ij) matrix is advantageously used to perturb the threshold decision whether to print a dot in a particular pixel—or how much error to pass along to other cells, or both.

These embodiments can compensate for some interswath density variations even when due to aiming errors at ends of the printhead, i. e. true swath-height error. Positive swath-height error, which is to say overlong swath dimension along the advance axis leading to swath overlap, can be actually eliminated by lowering the firing intensity of end elements—i. e. turning them down or entirely off.

Even a slight negative swath-height error can be substantially corrected by raising the intensity of those end elements to provide extra inking at the ends of the array. Although the directionality error may remain, its effects can be masked—either by some ink migration on the page after deposition, or by an optical illusion which visually blends a white streak with an immediately adjacent dark line formed by extra inking.

(1) Some benefits—Compared with other techniques, these embodiments of the invention are more effective in managing very large numbers of weak (or dark) nozzles. These embodiments also work well in printmodes with one pass or a small number of passes, for which other techniques work poorly or not at all.

In addition these embodiments are computationally quick. For each print the perturbed halftone matrix need be calculated only once, a fairly minor task, and all the correction work is thereafter free—done in the process of halftoning. This characteristic makes these embodiments of the invention particularly powerful for printers with limited computational power or memory.

2. Simplified Numerical Examples

Assume first a system that has a six-nozzle printhead and uses a dither mask (halftone matrix) which is six rows tall and six columns wide. This mask is used to determine where to print each dot, based on input Contone image data having values of zero through 255 at each pixel:

|  | column 1 | column 2 | column 3 | column 4 | column 5 | column 6 |
| --- | --- | --- | --- | --- | --- | --- |
| row1 | 1 | 161 | 81 | 17 | 188 | 204 |
| row2 | 65 | 225 | 209 | 129 | 60 | 124 |
| row3 | 177 | 33 | 241 | 97 | 8 | 168 |
| row4 | 49 | 113 | 145 | 193 | 72 | 14 |
| row5 | 232 | 174 | 94 | 30 | 184 | 200 |
| row6 | 78 | 238 | 222 | 142 | 56 | 120 |

As is conventional, the matrix is tiled across the entire image. A dot is printed at each location where the Contone data value exceeds the halftone cell value.

(a) Weak nozzles—Now assume that nozzles number 3 and 4 print twenty-percent lighter than their neighbors—i. e., that rows 3 and 4 in each six-row sequence on a page are lighter than the other four rows. The invention can therefore modify these rows by using the correction formula to adjust the average darkness of printing by nozzles number 3 and 4.

A suitable implementation for this example uses row correction-factor and overall gamma values of a=−0.2 and b=2.2; the negative sign for a may be understood as a designation that the row is light, or weak. These settings cause the numbers in the dither mask, for the weak nozzles, to be lower—so that the threshold condition for printing is more easily satisfied.

Therefore the third and fourth nozzles print more frequently, raising the density of the corresponding two rows. Inserting these correction-factor and gamma values into the formula introduced earlier, the new values for these two rows will follow the rule:

$$M'(ij)=M(ij)+a(N(ij))\cdot M(ij)^{b(N(ij))}$$

$$=M(ij)-0.2\cdot M(ij)^{2.2}.$$

As will be recalled, the values must be suitably prenormalized and renormalized to the 255-value scale; this is not explicitly shown here. It may be seen, however, in the results.

|  | a | b, gamma | column 1 | column 2 | column 3 | column 4 | column 5 | column 6 |
| --- | --- | --- | --- | --- | --- | --- | --- | --- |
| row1 | 0 | 2.2 | 1 | 161 | 81 | 17 | 188 | 204 |
| row2 | 0 | 2.2 | 65 | 225 | 209 | 129 | 60 | 124 |
| row3 | −0.2 | 2.2 | 154 | 32 | 196 | 90 | 7 | 147 |
| row4 | −0.2 | 2.2 | 47 | 104 | 130 | 165 | 68 | 13 |
| row5 | 0 | 2.2 | 232 | 174 | 94 | 30 | 184 | 200 |
| row6 | 0 | 2.2 | 78 | 238 | 222 | 142 | 56 | 120 |

By virtue of the negative sign of a=−0.2, rows 3 and 4 now contain smaller values than before, so that, as explained above, after these numbers are applied in the thresholding process more dots will be printed for like density. Furthermore, by virtue of the elevated value of gamma or b>>1, large values have changed more than small ones have—which implies that greater adjustment will occur in darker image regions. This effect is desirable because light-printed rows are more noticeable in darker regions.

(b) Interswath bleed—For another example, assume that a printhead is producing bleed between swaths. Such a defect causes darker appearance in the printout at the swath edges.

The invention can resolve this by modifying rows number 1 and 6 to reduce the amount of ink printed at the swath edges. In this case preferably the correction factor a=+0.5 (the positive sign corresponding to overstrong or dark nozzles), and gamma b=4, so that the formula appears thus:

$$M'(ij)=M(ij)+0.5 \cdot M(ij)^4,$$

and the first and sixth rows of the modified matrix now contain larger values than before (Note that the printheads and their nozzle arrays are shown at various heights relative to one another, and relative to the nominal swath limits 137. Thus the nozzles that are marked 123R-126R in the drawing are those which remain reserved after the alignment process has selected only some of all the initially reserved nozzles for use in printing.)

For a particular nozzle array 123 that has zero SWE (dashed lines 153H are horizontal), a swath-data array 133 with nominal swath boundaries 137 results in a printed swath 153—printed in cyan, C, for the illustrated example. This swath 153 is likewise aligned to the same nominal boundaries 137.

In the prior art, no printing-medium overadvance is needed for such an ideal case—and in the simplest of the preferred data-scaling embodiments (FIG. 5) of the present invention, no scaling of the input data 133' is needed, either—to obtain a well-aligned cyan printout C'. (Unlike the cases considered in FIGS. 1 through 3, the data content here is immaterial, and accordingly no internal structure is illustrated for the printout 153.)

|       | a    | b, gamma | column 1 | column 2 | column 3 | column 4 | column 5 | column 6 |
|-------|------|----------|----------|----------|----------|----------|----------|----------|
| row1  | +0.5 | 4        | 1        | 181      | 82       | 17       | 225      | 255      |
| row2  | 0    | 4        | 65       | 225      | 209      | 129      | 60       | 124      |
| row3  | 0    | 4        | 177      | 33       | 241      | 97       | 8        | 168      |
| row4  | 0    | 4        | 49       | 113      | 145      | 193      | 72       | 14       |
| row5  | 0    | 4        | 232      | 174      | 94       | 30       | 184      | 200      |
| row6  | +0.5 | 4        | 79       | 333      | 294      | 154      | 56       | 126      | so that fewer dots are printed in the corresponding rows of the image. This should compensate for the darker appearance at swath boundaries.

Again, using a large gamma—well over unity—provides a larger correction in dark areas, where this problem too is more noticeable. In practice, values larger than 255 in most systems are best clipped to 255.

3. "SWE" Correction by Data Scaling (a) The SWE problem and data scaling—In the prior art, a color plane corresponding to a printhead with nominal swath height H and actual swath height H+h must be printed with an overadvance (if SWE is positive) equal to the error h in each pass. Avoiding all the adverse consequences of such overadvance is a major objective of preferred data-scaling embodiments of the invention.

The image data 134 (FIG. 4) for such a color plane can instead by scaled down by the factor H/(h+H). This adjustment affects the height of each individual swath so that in theory the influence of the error h cancels out:

$$(H+h) \cdot \frac{H}{H+h} = H.$$

To see how this technique works, it is necessary to consider an element not shown expressly in FIGS. 1 through 3, namely the input data 133-136 (FIG. 4). Another feature of specific interest—particularly in compensating for negative SWE, as will be seen—is the reservation of nozzles 123R-126R at the ends of the array for use in interpen alignment.

(b) Correcting positive SWE—For a particular nozzle array 124 that has a positive swath-height error effect 154H (FIG. 4), however, a swath-data array 134 with the same nominal swath boundaries 137 instead expands into an over-long swath 154. To cure this error the input data 134 are scaled down, in inverse proportion to the expansion 154H, to form a shallower data array 134' (FIG. 5).

This technique, unlike the modified-matrix embodiment discussed earlier, requires no formation of any inverse function. Rather, the expanding pattern 154H is permitted to persist—but based upon a smaller starting base in the contracted data 134'. Some related teachings appear in the previously mentioned documents of Askeland.

In printing now, to a first approximation a proportional expansion 154H' should provide a new, likewise shallower swath printout 154'—in magenta, M, for the illustrated example—that is fitted to the nominal swath boundaries 137. What makes this only a first approximation, once again, is nonlinearity of the PAD error, i. e. second-order effects: it may be only the nozzles at the extreme ends of the nozzle array 124 that are particularly responsible for the bulk of the PAD error and therefore the SWE 154H—but the shallower data array 134' never invokes these nozzles.

Nevertheless, with iteration as indicated earlier for the modified-matrix embodiments the data-scaling embodiments too can ordinarily find the optimum data scaling for a precise fit of the positive-SWE nozzle output to the nominal swath boundaries 137. This solution discards no part of the image; however, some inherent internal image deformation arises from the concentration of PAD error in particular regions of the nozzle array, and the present method makes no effort to correct this extremely small deformation.

Some lowering of tonal level may be seen in the end regions of the printed swath as suggested earlier, perhaps due to diverging inkdrop paths there. Such effects can be corrected by simultaneous application of the modified-matrix embodiments of the invention, to adjust the level while data scaling is used to adjust the swath height.

(c) Correcting moderate negative SWE—As in the earlier modified-matrix discussion, it is helpful to consider two distinct subcases of negative error, i. e. error h<0. The first of these subcases involves error whose absolute value is relatively small.

The error h due to PAD error in the particular nozzle array 125 can be seen as a contracting pattern 155H (FIG. 4), yielding a slightly shallow swath 155—to be printed in yellow, Y, for the illustrated example. Consequently, to compensate, the data scaling expands the corresponding data swath 135, providing a slightly taller scaled data array 135' (FIG. 5).

Now with a contraction 155H' proportional to the original contraction 155H, the printed swath 155' precisely matches the nominal swath boundaries 137. This is taken to be physically possible because there are physical nozzles available above and below the nominal boundaries 137 to print the data in those positions.

Those nozzles are some of the nozzles 125R nominally reserved for alignment, as mentioned earlier. FIG. 5 shows this condition for the scaled yellow array 135', nozzle array 125, and the resulting neatly aligned yellow swath 155'.

Because of the varying mechanical alignment of the printheads (as distinguished from their nozzle arrays), the numbers of nozzles 125R remaining reserved after software alignment—as marked in the drawings—in general are different at top and bottom of each array, as well as from pen to pen. For the particular example illustrated as array 125, this fact does not come into play—since ample reserved nozzles 125R are shown as remaining available at both ends.

For this first subcase 135', of moderate negative swath-height error, as seen it is possible to achieve a nominal swath height—just matching that of the zero-error and positive-error cases 133', 134'. If all the pens conformed to one or another of these three models, these simple scaling procedures would enable all pens to print compatibly and consistently.

(d) Correcting severe negative SWE—The second and more-complicated subcase arises for significantly more severe negative SWE 156H (FIG. 4), as seen in the example for the particular black-printing nozzle array 126. In this example the scaled data 136' extend not only well beyond the nominal swath boundaries 137 but also beyond the nozzles 126R remaining available.

The example also shows a slightly greater number of nozzles 126R above the upper swath boundary than below the lower swath boundary. In other words, the top 126T of the nozzle array is farther outside the swath than the bottom 126B of the array.

To obtain symmetrical trimming to both top and bottom boundaries 137, however, the controlling dimension is the shorter distance below the swath to the array bottom 126B. Equidistant above the swath is a symmetrical position 126S, which defines the upper usable limit of the array. To maintain the software alignment, the top 126T of the array is thus outside the usable range.

The black-marked top and bottom zones 138 of the scaled-up data 136' cannot be printed: no nozzles are physically present for the purpose below the bottom 126B or above the top 126T of the array; and alignment requirements as just explained prevent use of nozzles in the shallow, slightly lower region between the top 126T and the earlier-mentioned symmetrical limit 126S. (The dark shading 138 here accordingly has a different significance from that at 143D, 144D, 146H in FIGS. 2 and 3.)

This obstacle arises whenever the scaled data height $H^2/(H+h)$ exceeds the height of the maximum usable nozzle complement 156M. The numerical value of the latter 156M cannot be stated in general, since it depends upon the degree of asymmetry and hence upon the severity of mechanical misalignment between the pens.

In cases of extreme mechanical misalignment, all the reserved nozzles at one end of the array or the other are used. In this case the maximum available complement 156M equals the nominal array height H and any negative SWE at all is too much to be resolved by the particular scaling approach of FIG. 5.

Redefining, more generally, m as the height of the maximum usable nozzle complement (i. e. the distance 156M), the condition for inadequate available nozzles is:

$$\frac{H^2}{H+h} > m$$

$$h < H\left(\frac{H}{m} - 1\right)$$

$$|h| > H\left(1 - \frac{H}{m}\right)$$

Since m is always at least as large as H, the parenthetical expression in the second line is always zero or negative—and the unavailable-nozzle condition arises for SWE that is negative (h<0) and of magnitude large enough to satisfy the condition in the third line.

Although the FIG. 5 technique is essentially forbidden in such cases, scaling in general continues to be an attractive option—but requires additional steps. In this case the swath 156 (in the example) of smallest effective height is first identified, and this swath height becomes the controlling dimension for all of the pens.

The image data for the pen 126 with this smallest swath height $H_{MIN}$ is scaled to the maximum available nozzle complement m for that pen 126. This process yields a scaled data array 136" (FIG. 6), for that pen 126.

The pen now necessarily (i. e. by definition) has sufficient available nozzles to print. As mentioned above, however, the array 136" may be no taller than the nominal swath height H—i. e. may just fit the nominal boundaries 137.

The negative SWE phenomenon 156H" normally persists, though as before iterative measurement may be needed to determine its effective value considering the second-order effect described earlier. Given the scaled data 136" and corresponding SWE 156H", a swath 156" can now be printed with new height 156N proportionally shallower than the data 136" and also shallower than the nominal swath height H defined by the nominal boundaries 137.

The height 156N of swath 156" defines a new set of swath boundaries 139 for the system. Other data planes 133, 134, 135 are now rescaled so that their respective SWE effects will all produce printed swaths C", M", Y" precisely fitted to this new system swath height 156N.

This process yields (possibly with iterations as discussed earlier) three more newly scaled data arrays 133", 134" and 135". Depending upon the several factors discussed above, they may be equal to, shallower than or taller than the new system swath height 156N (and the original nominal swath height H)—but all four printed swaths C", M", Y" and K" are of equal height.

The printing-medium advance stroke is adjusted to match this new common swath height 156N. Redefining, more generally, n as the new advance distance and common swath height (i. e. for the example in FIG. 6, the distance 156N), this new system swath height n is set by the parameters of the controlling pen:

$$n = m\frac{H_{min}}{H} = m\frac{H+h}{H}$$

(but preferably making further allowances for necessary iteration).

(e) Review of scaling techniques—Since the scale of each source-image swath is in general changed, not only the individual swath heights but the final overall length, too, of the printout is changed too. Each swath height becomes either the original nominal one H or a new system standard n—found to a first approximation from the initial height $M_{MIN}$ of the shallowest swath considered together with the available nozzle complement m of the corresponding pen as explained above.

The printed area is filled completely, with neither dark bands nor white streaks. For multiple-color images, in the first analysis the process is applied to each color plane independently and according to the swath-height error of its corresponding printhead only. Through this procedure, however, all of the swath heights are made equal to each other and to the nominal or new system swath height.

Through this technique the residual errors can be as small as the precision in measuring each printhead's swath-height error, for monocolor drawings. In plural-color drawings the errors can be always smaller than a half dot row as will be seen below.

As suggested above, successful practice of these preferred embodiments of the invention requires some measurement to form the basis for the scaling. What is indicated for this purpose, in the above discussion, is direct measurement of swath height and thereby its effective error.

Another valuable feature is the possibility of measuring not the printhead swath-height error but rather only its associated ideal paper-advance stroke that minimizes banding. Such techniques appear in the previously mentioned patent document of Cluet.

Whether these preferred embodiments of the invention are practiced by measuring swath height or ideal advance, in essence the response is the same—namely, using that measured value as the basis for a scaling adjustment as set forth above. In either event the quantity H+h is taken as that measured value, and H is the initial nominal swath height.

Merely scaling the data has no effect upon the physical length of the printhead. When h is positive, the scaling operation has the effect of shortening the swath height to be printed—and this shortening is implemented automatically when the printing system assigns dots for printing by particular nozzles.

That is to say, for some nozzles (at one or both ends of the printhead) in the positive-SWE case there simply never are any dots to print—at least in a single-pass printmode. Those nozzles accordingly are always idle.

When h is negative, however, the scaling operation has the effect of lengthening the swath height to be printed—and at the ends of the printhead, all other things being equal, this may call for printing by nozzles that are physically nonexistent. This conclusion is not always applicable, because many printing systems reserve nozzles at the ends of the array for effective mutual alignment of different printheads.

In such a system, at least in principle reserved nozzles can be called back into service where necessitated by scaling from a negative swath-height error h. When such reserved nozzles are not available, the invention is still straightforwardly implemented by the procedure in subsection (d) above.

In that procedure, to avoid invoking nozzles that are physically absent from the system, it is only necessary to ensure that scaling is never an expansion beyond a ratio that calls into play all available nozzles (including reserved ones). To simplify this rule, ignoring for now the possibility of reserved nozzles it is only necessary to ensure that scaling is never an expansion—i. e. is always by a factor equal to or less than unity.

This condition is ensured by first determining which printhead has the effective (i. e. scaled) swath height $H_{MIN}$ which is shortest (more than one height may be equal to this same value) and then scaling all of the other heads to match that height. Bearing in mind that this overscaling problem occurs only when at least one of the SWE values is negative, h<0, it can be assumed that at least the shortest swath height is H+h<H (the value H as before being the nominal swath height).

Next the printing-medium advance stroke is set to underadvance by the amount h of the error for that particular head, the one with shortest effective height. Sometimes the entire nozzle complement of that head can be used.

The printing-medium advance stroke for all heads is now known—since the system is capable of providing only one single advance distance, common to all heads. Scaling for all the other heads (and their corresponding color planes) must now be a rescaling to that shortest swath-height value $H_{MIN}$—instead of scaling to their own respective nominal heights as before.

Now by definition of $H_{MIN}$ each scaling is either an underscaling (scaling by a factor less than unity) or an equality (scaling by a multiple of one). Hence the problem of scaling up into a range of nonexistent nozzles is eliminated.

More specifically, depending on the SWE values, each other head will use a number of nozzles equal to or fewer than those of the head with minimum height $H_{MIN}$. The scale factor for each other color plane and nozzle will be found by calling the function round[n·H/(H+h)].

As noted earlier, residual error is always smaller than a half dot row, since this is the rounding error that keeps banding defects in an acceptable range for fast, single-pass printouts. This solution optimizes area-fill time, maximizes nozzle usage and maintains maximum accuracy of overall page length.

4. Mechanical and Program/Method Features

The invention is amenable to implementation in a great variety of products. It can be embodied in a printer/plotter that includes a main case 1 (FIG. 7) with a window 2, and a left-hand pod 3 which encloses one end of the chassis. Within that enclosure are carriage-support and -drive mechanics and one end of the printing-medium advance mechanism, as well as a pen-refill station with supplemental ink cartridges.

The printer/plotter also includes a printing-medium roll cover 4, and a receiving bin 5 for lengths or sheets of printing medium on which images have been formed, and which have been ejected from the machine. A bottom brace and storage shelf 6 spans the legs which support the two ends of the case 1.

Just above the print-medium cover 4 is an entry slot 7 for receipt of continuous lengths of printing medium 4. Also included are a lever 8 for control of the gripping of the print medium by the machine.

A front-panel display 211 and controls 212 are mounted in the skin of the right-hand pod 213. That pod encloses the right end of the carriage mechanics and of the medium advance mechanism, and also a printhead cleaning station. Near the bottom of the right-hand pod for readiest access is a standby switch 214.

Within the case 1 and pods 3, 213 a cylindrical platen 241 (FIG. 9)—driven by a motor 242, worm and worm gear (not shown) under control of signals from a digital electronic processor 71—rotates to drive sheets or lengths of printing medium 4A in a medium-advance direction. Print medium 4A is thereby drawn out of the print-medium roll cover 4.

Meanwhile a pen-holding carriage assembly 220 (FIGS. 8 and 9) carries several pens 223-226 (FIG. 8) back and forth across the printing medium, along a scanning track—perpendicular to the medium-advance direction—while the pens eject ink. As mentioned earlier, this is one but not the only form of incremental-printing apparatus, an alternative being use of a page-wide pen array with relative motion in relation to the full length of the printing medium. (As will be understood, the term "scan" is also used in describing motion of a measuring sensor over the printing medium, most usually along the medium-advance direction.)

For simplicity's sake, only four pens are illustrated; however, as is well known a printer may have six pens or more, to hold different colors—or different dilutions of the same colors—as in the more-typical four pens. The medium 4A thus receives inkdrops for formation of a desired image, and is ejected into the print-medium bin 5. A colorimetric image sensor 251, quite small, rides on the carriage with the pens.

A very finely graduated encoder strip 233, 236 (FIG. 9) is extended taut along the scanning path of the carriage assembly 220 and read by another small automatic optoelectronic sensor 237 to provide position and speed information 237B for the microprocessor. One advantageous location for the encoder strip is shown in several of the earlier cross-referenced patent documents at 236, immediately behind the pens.

A currently preferred position for the encoder strip 233 (FIG. 8), however, is near the rear of the pen-carriage tray—remote from the space into which a user's hands are inserted for servicing of the pen refill cartridges. For either position, the encoder-strip sensor 237 is disposed with its optical beam passing through orifices or transparent portions of a scale formed in the strip.

The pen-carriage assembly 220, 220' (FIG. 9) is driven in reciprocation by a motor 231—along dual support and guide rails 232, 234—through the intermediary of a drive belt 235. The motor 231 is under the control of signals from digital processors 71.

Naturally the pen-carriage assembly includes a forward bay structure 222 for the pens—preferably at least four pens 223-226 holding ink of four different colors respectively. Most typically the inks are yellow in the leftmost pen 223, then cyan 224, magenta 225 and black 226. As a practical matter, chromatic-color and black pens may be in a single printer, either in a common carriage or plural carriages.

Figure 8:
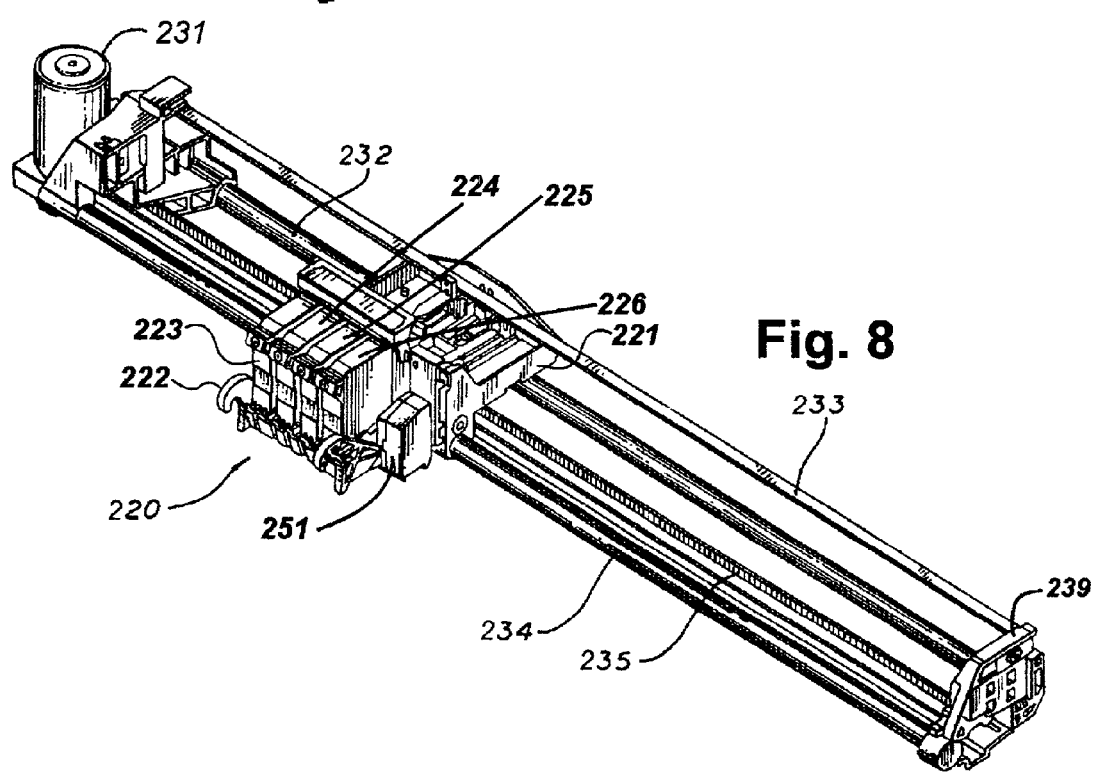
FIG. 8 is a like view of a scanning carriage and medium-advance mechanism in the FIG. 7 printer.

Also included in the pen-carriage assembly 220, 220' is a rear tray 221 carrying various electronics. FIGS. 7 and 8 most specifically represent a system such as the Hewlett Packard printer/plotter model "DesignJet 1000", which does not include the present invention. These drawings, however, also illustrate certain embodiments of the invention, and—with certain detailed differences mentioned below—a printer/plotter that includes preferred embodiments of the invention.

Figure 9:
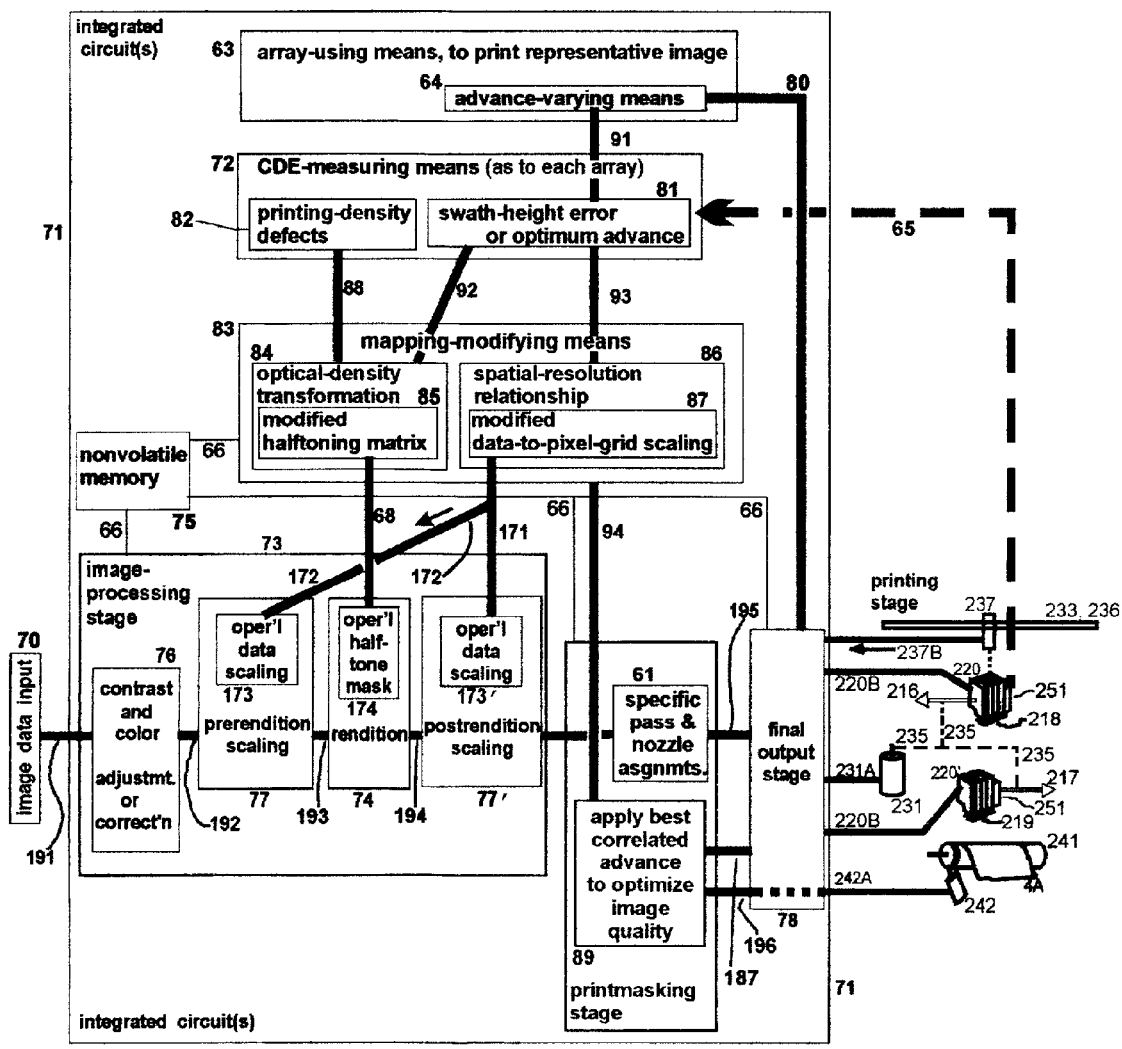
FIG. 9 is a highly schematic diagram of the working system of the FIGS. 7 and 8 printer, particularly as used to practice preferred embodiments of the above-introduced aspects of the invention.
Figure 10:
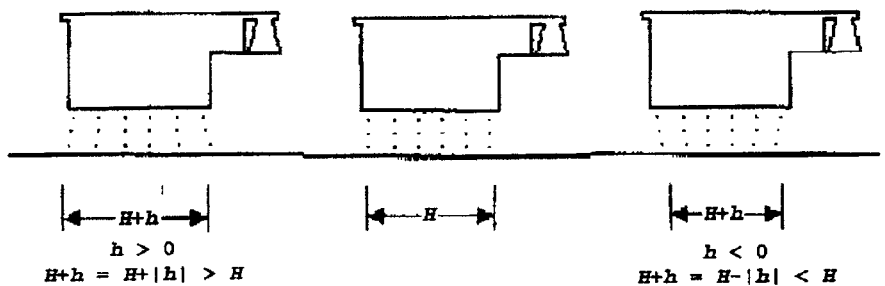
FIG. 10 is a diagram showing the origin of three different SWE values: positive at left, zero in the center view, and negative at right.
Figure 11:
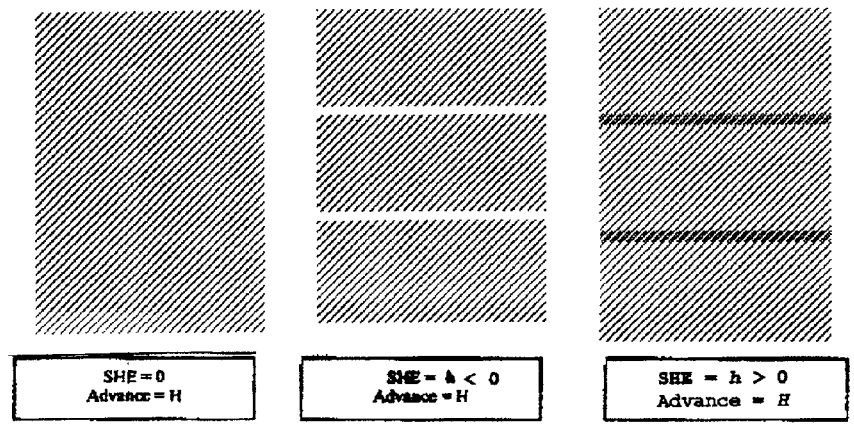
FIG. 11 is a representation of output print quality for uniform area-fill data input, with the same three SWE values—but zero at left, negative in the center view, and positive at right.
Figure 12:
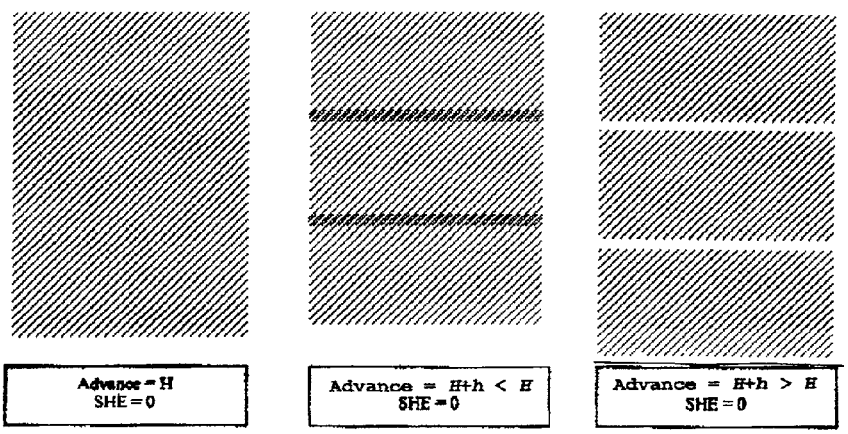
FIG. 12 is a like representation of print quality for uniform fill with zero SWE, using three different printing-medium advance strokes—nominal, underadvance, and overadvance.

Before further discussion of details in the block diagrammatic showing of FIG. 9, a general orientation to that drawing may be helpful. Most portions 70, 73-78, 95 across the lower half of the diagram, including the printing stage 4A-251 at far right, and the pass and nozzle assignments 61, are generally conventional and represent the context of the invention in an inkjet printer/plotter.

The top portion 63-72, 81-87 and certain parts 171, 172, 89 of the lower portions of the drawing represent the present invention. Given the statements of function and the swath diagrams presented in this document, an experienced programmer of ordinary skill in this field can prepare suitable programs for operation of all the circuits.

The pen-carriage assembly is represented separately at 220 when traveling to the left 216 while discharging ink 218, and at 220' when traveling to the right 217 while discharging ink 219. It will be understood that both 220 and 220' represent the same pen carriage.

The previously mentioned digital processor 71 provides control signals 220B to fire the pens with correct timing, coordinated with platen drive control signals 242A to the platen motor 242, and carriage drive control signals 231A to the carriage drive motor 231. The processor 71 develops these carriage drive signals 231A based partly upon information about the carriage speed and position derived from the encoder signals 237B provided by the encoder 237.

(In the block diagram almost all illustrated signals are flowing from top toward bottom and left toward right. The exceptions are the information 237B fed back from the codestrip sensor 237, the image-density measurement profile data 65 fed back from the colorimetric sensor 251, and the scaling information 172—all as indicated by the associated leftward arrows.)

The codestrip 233, 236 thus enables formation of color inkdrops at ultrahigh precision during scanning. This precision is maintained in motion of the carriage assembly 220 in each direction—i. e., either left to right (forward 220') or right to left (back 220).

New image data 70 are received 191 into an image-processing stage 73, which may conventionally include a contrast and color adjustment or correction module 76 and rendition and scaling modules 74, 77, 77'. Most commonly scaling 77 (if any) occurs before rendition 74; however, as shown it is currently known to perform some or all scaling 77' after rendition.

A rendition stage 74 typically includes some operational dither matrix 174 or equivalent—e. g. an error-diffusion stage. The operational mask 174 is ordinarily a standard conventional mask, nowadays preferably corrected with a so-called "blue noise" characteristic.

According to the present invention, however, the mask is preferably customized according to instructions 68. Analogously the pre- and postrendition scaling modules 77, 77' when present typically include standard conventional scaling specifications 173, 173', but in accordance with the invention these values are preferably modified according to instructions 172, 171.

Information 195 passing from the image-processing modules next enters a printmasking module 95. This generally includes a stage 61 for specific pass and nozzle assignments. The latter stage 61 performs generally conventional functions.

Integrated circuits 71 may be distributive—being partly in the printer, partly in an associated computer, and partly in a separately packaged raster image processor. Alternatively the circuits may be primarily or wholly in just one or two of such devices.

These circuits also may comprise a general-purpose processor (e. g. the central processor of a general-purpose computer) operating software such as may be held for instance in a computer hard drive, or operating firmware (e. g. held in a ROM 75 and for distribution 66 to other components), or both; and may comprise application-specific integrated circuitry. Combinations of these may be used instead.

As set forth above, images to be printed and scanned to establish the modifications prescribed by the present invention may be representative area-fill images of different colors, for reading by the optical sensor 251 to generate calibration data. For generation of such test images, the apparatus of the invention includes—in the integrated-circuit section 71 (FIG. 9)—array-using means 63 that generate control signals 80 for operation of the final output stage 78. These signals drive the printing stage seen at right.

Some portions of FIG. 9 correspond to the advance-optimization functions mentioned earlier. In the case of those optimization embodiments, the array-using means 63 include advance-varying means 64—and in this case the control signals 80 include a series of different parameters for test.

Such a series of parameters may for example include a sequence of different printing-medium advance values, as described in detail in the previously identified Cluet document. Each value is duly implemented by the final output stage 78 and its advance-mechanism signals 242A.

These signals 242A are further implemented, in printing of the test images, by the movements of the advance motor 242, drive 241 and medium 4A. The sequence of parameter values is also signaled 91 to color-deposition-error measuring means 72, for use in correlation as also described by Cluet. In the case of the present invention, such correlation yields an advance value that in turn is used in the scaling operations already detailed above.

A small automatic optoelectronic sensor 251 rides with the pens on the carriage and is directed downward to obtain data about image quality—more specifically, uniformity in area fills and swath height, for purposes of the adjustments set forth earlier in this document. The sensor 251 signals are coordinated (not shown) with movements of the carriage and advance mechanism, and thereby can readily perform optical measurements 65, 81, 82 (FIG. 9) of the printed test images. Suitable algorithmic control is well within the skill of the art, guided by the discussions here.

The deposition-error-measuring means 72 receive measurement data 65 returned from the sensor 251. In the case of the optimization embodiments, the CDE-measuring means 72 include means 81 for correlating these quality data 65 with the advance-varying data 91 from the above-mentioned varying means 64.

The correlation data 93, 94 in turn pass to image-optimizing means 89, particularly for control 196 of the printing-medium advance stroke. These data 93, 94 may be used for control 187 of other parameters such as printmode; print-medium advance speed; scan velocity; inkdrop energies, sizes and velocities; depletion, propletion and discretionary-dotting ratios; balance point between randomization vs. granularity; and also nozzle weighting distributions.

This correlation function, however—described with greater particularity by Cluet—is here somewhat tangential. For present purposes it simply serves as a way of establishing the previously mentioned ideal swath-height value m employed in the scaling embodiments of the present invention. In any event, the settings in turn pass 187, 196 to the final output stage 78 for control of the printing stage.

Other portions of FIG. 9 related to the mapping modifications of the present invention, detailed above. In this case generally there may be no advance-varying means 64 or correlating means 89, but there are measurement control signals 80 and resulting measurement data 65.

In these embodiments, the measurement data 65 proceed to means 81 or 82 (or both) for respectively quantifying swath-height or density characteristics of the printheads 223-226. These two possibilities will now be followed separately.

In the relatively simpler case of printing-density defect data 82, as indicated in the earlier detailed discussion such data follow a path 88 to a density-transformation stage 84. In that stage the information is used to form a specifically customized halftoning matrix (or error-diffusion threshold structure) 85, which is then substituted 68 for the standard mask etc. 174 in the rendition stage.

In the more-complicated case of swath-height characteristic data 81 for use in correction, as indicated in the above detailed discussion such data may follow either (1) in path 92 to the same density-transformation stage 85 just discussed, or (2) a path 93 to a spatial-resolution modifying stage 86—or (3) in some cases both.

In the case of the path 93 to the spatial-resolution stage 86, the swath-height characterizing data 81 are applied in forming a modified structure 87 of data scaling. This structure 87 can be applied 172, 171 in lieu of standard scaling 173, 173' in either prerendition or postrendition scaling 77, 77'.

The above disclosure is intended as merely exemplary, and not to limit the scope of the invention—which is to be determined by reference to the appended claims.

What is claimed is:

1. Apparatus for printing a desired image on a printing medium, based upon input image data, by construction from individual marks of at least one colorant, formed in a pixel grid; said apparatus comprising:

for each colorant, at least one respective multielement printing array that is subject to mark-intensity errors of individual printing elements, including variations in printed intensity as among said elements of the array;

means for measuring mark-intensity errors of the at least one array;

means for modifying, without entirely replacing, a preexisting multicolumn, multirow numerical tabulation that defines an intensity correspondence between such input image data and such marks, to compensate for the measured mark-intensity errors;

said modifying means and said modified tabulation comprising means for controlling a halftoning stage or other rendition stage of the printing apparatus;

wherein said modifying means comprise means for introducing continuous control enabling compensation that is different for different print densities;

wherein said halftoning or other rendition stage, prior to final printing preparations and in response to said measuring, enable precise reduction of said intensity variations as among said elements; and means for printing using the modified tabulation.

2. The apparatus of claim 1, wherein:

the apparatus has printing resolution on the order of 450 marks per inch; and the apparatus has mark-positioning addressability on the order of 450 marks per inch, or less.

3. The apparatus of claim 2, wherein:
the number of individual marking elements in use, divided by the number of rows in the tabulation, equals an integer;
the tabulation is one- or two-dimensional only;
for at least one of the plurality of multielement printing arrays, the mark-intensity error comprises a respective pattern of printing-intensity defects;
the measuring means comprise means for measuring the pattern of mark-intensity defects for each multielement printing array respectively; and
the modifying means comprising means for applying the respective pattern of defects, for at least one of the multielement printing arrays, to modify a respective said tabulation.

4. The apparatus of claim 1, wherein:
the means for introducing continuous control, enabling precise reduction of variations, comprise means for applying negative feedback based upon measured intensity variations.

5. The apparatus of claim 1, wherein:
the mark-intensity error comprises a pattern of printing-density defects;
the measuring means comprise means for measuring the pattern of printing-density defects;
the modifying means comprise:
means for deriving a correction pattern from the measured pattern of printing-density defects, and
means for applying the correction pattern to modify a halftone thresholding process; and
for each colorant, the printing means comprise means for printing such image incrementally, using the modified halftone thresholding process.

6. The apparatus of claim 1, wherein:
the measuring means comprise means for measuring mark-intensity error for individual printing elements, individually, of at least one of the multielement printing arrays, respectively; and
the modifying means comprise:
means for deriving a correction pattern from the measured mark-intensity error, and
means for applying the correction pattern to modify the tabulation.

7. The apparatus of claim 1, wherein:
the halftoning or other rendition stage comprises means defining a halftone matrix.

8. The apparatus of claim 1, wherein:
the halftoning or other rendition stage comprises means defining an error-diffusion protocol.

9. The method of claim 8, wherein the error-diffusion protocol comprises at least one of:
a progressive error-distribution allocation protocol of such error-diffusion halftoning; and
a decisional protocol for determining whether to mark a particular pixel.

10. The apparatus of claim 1, wherein:
the halftoning or other rendition stage comprises means for replacing error diffusion or halftoning threshold values above or below a particular value.

11. The apparatus of claim 1, wherein:
the halftoning or other rendition stage comprises means for multiplying error diffusion or halftoning threshold values by a linear factor.

12. The apparatus of claim 1, wherein:
the halftoning or other rendition stage comprises means for applying a gamma correction function to error diffusion or halftoning threshold values.

13. The apparatus of claim 1, wherein:
the halftoning or other rendition stage comprises a combination of at least two of:
means for replacing error diffusion or halftoning threshold values above or below a particular value;
means for multiplying each error diffusion or halftoning threshold value by a linear factor; and
means for applying a gamma correction function to error diffusion or halftoning threshold values.

14. A method of printing a desired image, by construction from individual marks of at least one colorant, formed in a pixel grid by at least one multielement printing array that is subject to a pattern of printing-density defects, including error in mark intensity of individual printing elements, considered individually, including variations in printed intensity as among said elements of the array; said method comprising the steps of:
measuring mark-intensity error;
deriving a correction pattern from the measured pattern of printing-density defects, including error in intensity;
applying the intensity-error correction pattern to correct the error, by modifying a halftone thresholding process that uses a halftoning matrix which is a predefined numerical tabulation;
wherein the applying step comprises preparing a modified form of the predefined numerical tabulation, based upon the intensity-error correction pattern, and then using that modified form of the tabulation;
said applying and preparing steps, and said modified form of the numerical tabulation, being used to control the halftoning matrix;
wherein said applying and preparing steps further comprise introducing continuous control, enabling compensation that is different for different print densities;
wherein said continuous control, in response to said measuring, enables precise reduction of said intensity variations as among said elements; and
for each said colorant, printing such image by said at least one multielement array respectively, using the halftone thresholding process modified on the basis of the intensity-error correction pattern.

15. The method of claim 14, for use with a printmask in plural-pass printing, said printmask being a defined system of numerical values, distinct from the measured pattern of defects and distinct from the derived correction pattern, that establishes the printing pass in which each ink mark is to be made; and further comprising the steps of, before or as a part of the applying step:
using such printmask to determine a relationship between the halftone matrix and the multielement array; and
employing the relationship in the applying step to control application of the correction pattern to the halftone matrix.

16. The method of claim 14, wherein:
the printing step comprises cooperation between plural printing elements that mark in a single common color, to form marks that together define a single common small region of such image in said common color.

17. The method of claim 14, wherein:
the method comprises no positional-error feedback to modify positional addressing of image data in relation to the pixel grid.

18. The method of claim 14, for use with said at least one multielement incremental-printing array that comprises a plurality of multielement printing arrays that print in a corresponding plurality of different colors or color dilutions, each multielement printing array being subject to a respective pattern of printing-density defects; and wherein:
    the measuring, deriving, applying and printing steps are each performed with respect to each multielement printing array respectively.

19. The method of claim 18, for use with such plurality of multielement incremental-printing arrays that are also each subject to a respective swath-height error; and wherein:
    the measuring, deriving, applying and printing steps are also employed to modify swath height of at least one of the multielement printing arrays, for accommodating any swath-height error present in each multielement printing array respectively.

20. The method of claim 14, wherein:
    the continuous control comprises application of negative feedback to make the uniformity of marking intensity relatively precise as among the individual marking elements.

21. The method of claim 14, wherein:
    the printing elements have a spacing along the array; and
    the printing step proceeds with a positioning precision and addressability that are coarser than or equal to said printing-element spacing along the array.

22. The method of claim 14, wherein:
    the applying step comprises modifying the average number of marks printed by an individual printing element whose mark intensity is defective.

23. A method of operating a printing apparatus to print a desired image, based on input image data, by construction from individual marks of at least one colorant, formed in a pixel grid by at least one scanning multielement printing array; said printing being subject to error in mark intensity of individual printing elements, considered individually, including variations in printed intensity as among said elements of the array; said method comprising the steps of:
    measuring mark-intensity error;
    based on the measured mark-intensity error, compensating for the intensity error without modifying position of particular marks relative to such pixel grid, or to any ideal form of such pixel grid;
    said compensating step comprising control of a halftoning stage or other rendition stage of the printing apparatus;
    wherein compensating corrections in said halftoning or other rendition stage prior to final printing preparations, as negative feedback in response to said measuring, enable precise reduction of said intensity variations as among said elements.

24. The method of claim 23, wherein:
    said scanning multielement printing arrays are at least two in number;
    each printing array forms a pixel grid that is at least partially different from a pixel grid formed by each other printing array, and from any ideal form of such pixel grid; and
    aside from linear alignment, no step of the method is directed to regularizing the pixel grids to one another or to such ideal form.

25. The method of claim 23, wherein:
    the compensating step comprises the step of adjusting thresholds of a preexisting tabulation that forms a relationship between said input image data and the individual printed marks,
    said threshold-adjusting step statistically increases or reduces usage of printing elements associated with said mark-intensity error, thereby increasing or decreasing total numbers of marks in image regions associated with those printing elements.

26. The method of claim 23, wherein:
    the measuring step comprises measuring mark-intensity error of printing elements considered as groups, said groups being fewer than all the printing elements for any given color.

27. Apparatus for printing a desired image on a printing medium, based upon input image data, by construction from individual marks formed in a pixel grid; said apparatus comprising:
    at least one multielement incremental-printing array that is subject to colorant-deposition error, including error in mark intensity of individual printing elements, considered individually, including variations in printed intensity as among said elements of the array;
    means for measuring mark-intensity error of the at least one array;
    means for modifying a multicolumn, multirow numerical tabulation, which forms an intensity relationship between such input image data and such marks, to compensate for the measured mark-intensity error; and
    means for printing using the modified tabulation;
    wherein the multielement printing array is an inkjet printhead;
    said modifying means and said modified tabulation comprising means for controlling a halftoning stage or other rendition stage of the printing apparatus;
    wherein said modifying means comprise means for introducing continuous control enabling compensation that is different for different print densities;
    wherein said halftoning or other rendition stage, prior to final printing preparations and in response to said measuring, enable precise reduction of said intensity variations as among said elements.

28. A method of printing a desired image, by construction from individual marks formed in a pixel grid by at least one multielement printing array that is subject to a pattern of printing-density defects, including error in mark intensity of individual printing elements, considered individually, including variations in printed intensity as among said elements of the array; said method comprising the steps of:
    measuring error in mark intensity;
    deriving a correction pattern from the measured mark-intensity error;
    applying the correction pattern to modify a halftone thresholding process that uses a halftoning matrix which is a predefined numerical tabulation;
    wherein compensating corrections, in said halftone thresholding process prior to final printing preparations, introduce continuous control enabling compensation that is different for different print densities and thereby enabling precise reduction of said intensity variations as among said elements;
    wherein the applying step comprises preparing a modified form of the predefined numerical tabulation, and then using that modified form of the tabulation, to correct the error in mark intensity; and
    printing such image using the modified halftone thresholding process;
    wherein the multielement printing array is an inkjet printhead.

29. Apparatus for printing a desired image on a printing medium, based upon input image data, by construction from individual marks of at least one colorant, formed in a pixel grid; said apparatus comprising:
    for each colorant, respective means for printing incrementally in that colorant;

each said printing means, for a particular one colorant, comprising at least one respective incremental-printing array that is subject to colorant-deposition error, including error in mark intensity of individual printing elements, considered individually, including variations in printed intensity as among said elements of the array;

means for measuring mark intensity error of the at least one array;

means for modifying a multicolumn, multirow numerical tabulation that forms an intensity relationship between such input image data and such marks, to compensate for the measured error in mark intensity;

wherein the numerical tabulation is not a halftone screen;

said modifying means and said modified tabulation being used to control a nonhalftoning rendition stage of the printing apparatus;

wherein compensating corrections in said halftoning or other rendition stage prior to final printing preparations, as negative feedback in response to said measuring, enable precise reduction of said intensity variations as among said elements; and means for printing using the modified tabulation.

30. Apparatus for printing a desired image on a printing medium, based upon input image data, by construction from individual marks formed in a pixel grid; said apparatus comprising:

at least one multihundred-element printing array that is subject to colorant-deposition error, including error in mark intensity of individual printing elements, considered individually, including variations in printed intensity as among said elements of the array;

means for modifying a multicolumn, multirow numerical tabulation that forms an intensity relationship between such input image data and such marks, to compensate for the measured error in mark intensity;

said modifying means and said modified tabulation being used to control a halftoning stage or other rendition stage of the printing apparatus;

wherein said modifying means comprise means for introducing continuous control enabling compensation that is different for different print densities;

wherein said halftoning or other rendition stage, prior to final printing preparations and in response to said measuring, enable precise reduction of said intensity variations as among said elements; and means for printing using the modified tabulation.

31. The apparatus of claim 30, wherein:

the means for introducing continuous control comprise means for applying negative feedback.

32. Apparatus for printing a desired image on a printing medium, based upon input image data, by construction from individual marks formed in a pixel grid; said apparatus comprising:

at least one multielement incremental printing array, having at least thirty printing elements, that is subject to colorant-deposition error, including error in mark intensity of individual printing elements, considered individually, including variations in printed intensity as among said elements of the array;

means for measuring intensity error of the at least one array;

means for modifying a multicolumn, multirow numerical tabulation, which forms an intensity relationship between such input image data and such marks, to compensate for the measured colorant-deposition error, including error in mark intensity;

said modifying means and said modified tabulation being used to control a halftoning stage or other rendition stage of the printing apparatus;

wherein compensating corrections in said halftoning or other rendition stage prior to final printing preparations, as negative feedback in response to said measuring, enable precise reduction of said intensity variations as among said elements; and means for printing using the modified tabulation.

33. The apparatus of claim 32, wherein:

the at least one multielement incremental printing array comprises a scanning printhead or a full-page-width printhead.

34. The apparatus of claim 32, wherein:

the printing means comprise at least one microprocessor controlling all of the at least thirty elements simultaneously during printing to select, and selectively actuate, particular elements for printing of particular pixels respectively.

* * * * *

UNITED STATES PATENT AND TRADEMARK OFFICE
CERTIFICATE OF CORRECTION

PATENT NO. : 7,417,768 B1  Page 1 of 1
APPLICATION NO. : 09/688610
DATED : August 26, 2008
INVENTOR(S) : David H. Donovan et al.

It is certified that error appears in the above-identified patent and that said Letters Patent is hereby corrected as shown below:

In column 4, line 11, delete "swath" and insert -- swaths --, therefor.

In column 12, line 9, delete "artificats" and insert -- artifacts --, therefor.

In column 15, line 63, delete "misrepresented" and insert -- mispresented --, therefor.

In column 19, line 9, delete "$M(ij)^{bNij)}$" and insert -- $M(ij)^{b(N(ij))}$ --, therefor.

In column 21, line 53, delete "instead by" and insert -- instead be --, therefor.

In column 30, line 3, delete "related" and insert -- relate --, therefor.

In column 30, line 22, delete "in path" and insert -- a path --, therefor.

Signed and Sealed this

Eleventh Day of November, 2008

JON W. DUDAS
*Director of the United States Patent and Trademark Office*